US012730649B2

(12) United States Patent
Martinez Vicente

(10) Patent No.: US 12,730,649 B2
(45) Date of Patent: Sep. 8, 2026

(54) DATA PROCESSING ARRAY

(71) Applicant: Arm Limited, Cambridge (GB)

(72) Inventor: Alejandro Martinez Vicente, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/889,939

(22) Filed: Sep. 19, 2024

(65) Prior Publication Data

US 2026/0079714 A1 Mar. 19, 2026

(51) Int. Cl.
*G06F 9/30* (2018.01)
*G06F 9/38* (2018.01)
*G06F 15/80* (2006.01)
*G06F 17/16* (2006.01)

(52) U.S. Cl.
CPC ........ *G06F 9/3885* (2013.01); *G06F 9/30036* (2013.01); *G06F 15/80* (2013.01); *G06F 17/16* (2013.01)

(58) Field of Classification Search
CPC .... G06F 9/3885; G06F 9/30036; G06F 15/80; G06F 17/16
See application file for complete search history.

(56) References Cited

U.S. PATENT DOCUMENTS 5,105,469 A * 4/1992 MacDonald ............ H04N 1/62 358/522
9,170,812 B2 * 10/2015 Vorbach ............. G06F 12/0875
10,621,269 B2 * 4/2020 Phelps ..................... G06N 3/02
2004/0054870 A1 * 3/2004 Kirsch ............. G06F 15/17337 712/16
2011/0202587 A1 8/2011 Chabot
2020/0026498 A1 1/2020 Sumbul et al.
2023/0074229 A1 * 3/2023 Jia ....................... G06F 15/7821

OTHER PUBLICATIONS

International Search Report and Written Opinion of the International Searching Authority for PCT/GB2025/051989 mailed Dec. 23, 2025, 16 pages.
G. Jeong et al, "RASA: Efficient Register-Aware Systolic Array Matrix Engine for CPU" Proceedings of the 58th ACM/IEEE Design Automation Conference, Dec. 5, 2021, pp. 253-258.

* cited by examiner

*Primary Examiner* — Corey S Faherty
(74) *Attorney, Agent, or Firm* — NIXON & VANDERHYE P.C.

(57) ABSTRACT

Apparatuses, computer programs and methods are disclosed, relating 2D arrays of data elements and a 2D array of processing elements. A first 2D array of data elements provides data values for processing by each processing element and a second 2D array of data elements provides control values controlling the processing. The 2D array of processing elements has a data flow direction across the 2D array of processing elements, and the data flow direction proceeds from a starting set of processing elements of the 2D array of processing elements. For each processing element not in the starting set of processing elements, the data processing operation preformed takes as an operand a respective data value provided by a neighbouring data element of the first 2D array of data elements and selection of the neighbouring processing element is controlled by a corresponding source control value in the second 2D array of data elements.

19 Claims, 16 Drawing Sheets

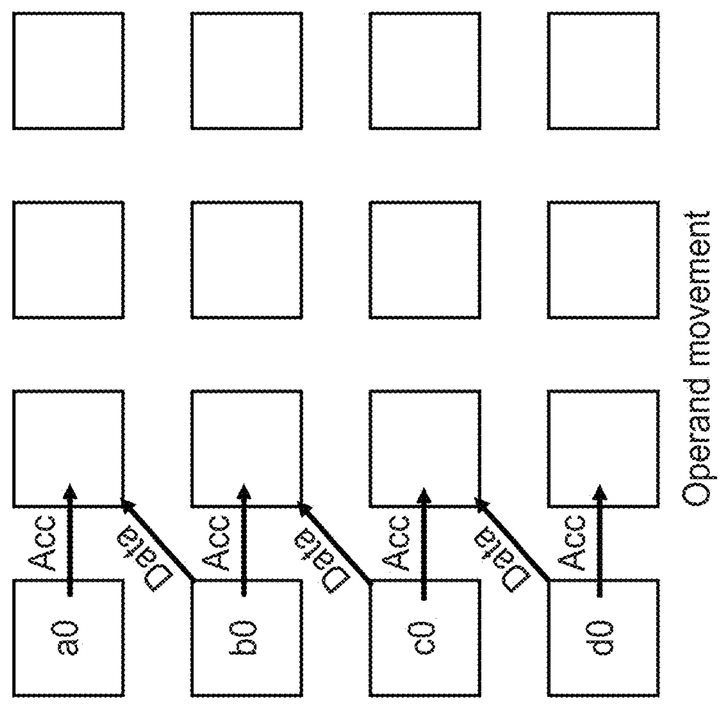
FIG. 8
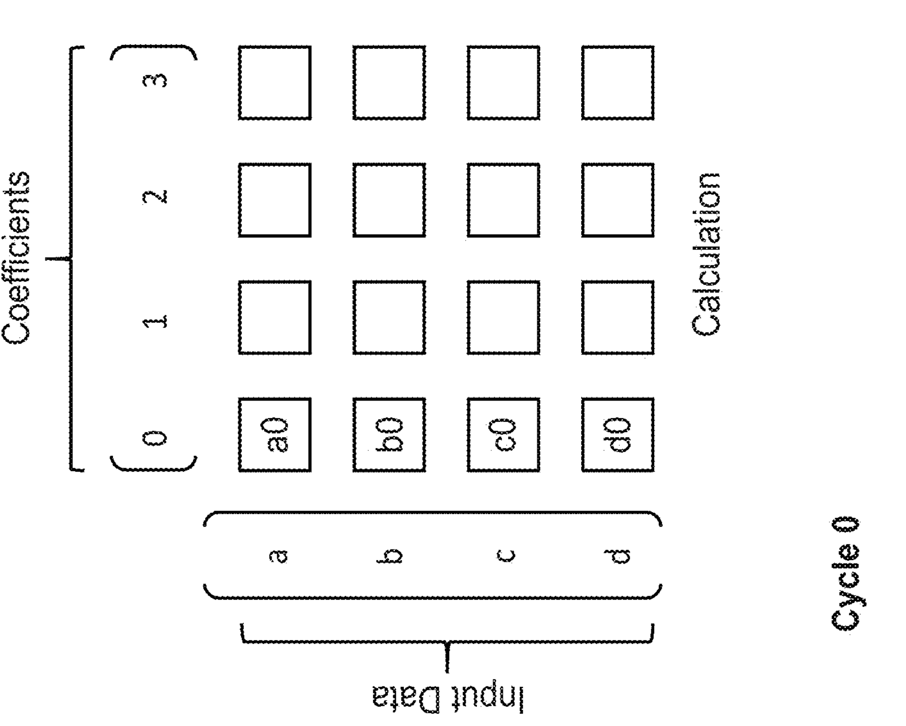

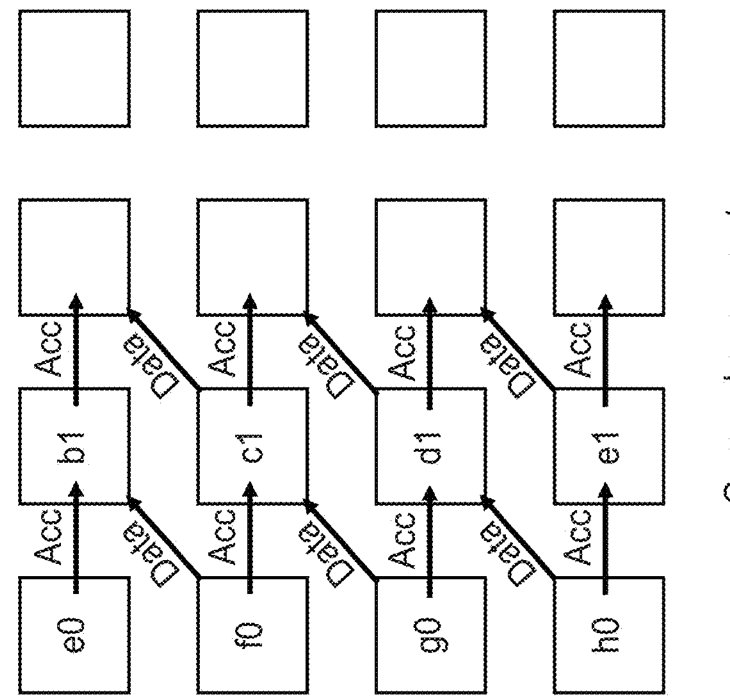
FIG. 9
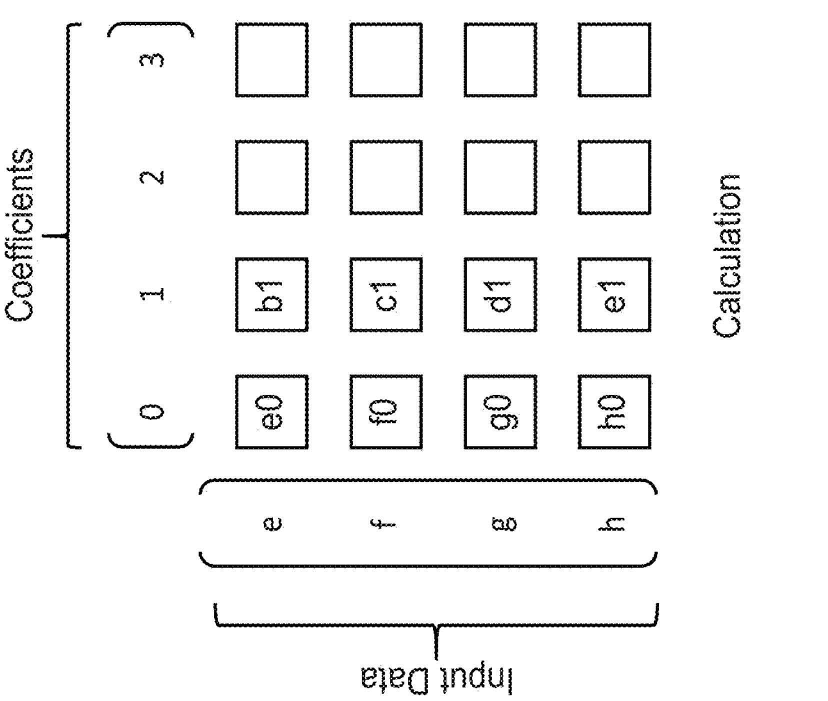
Cycle 1

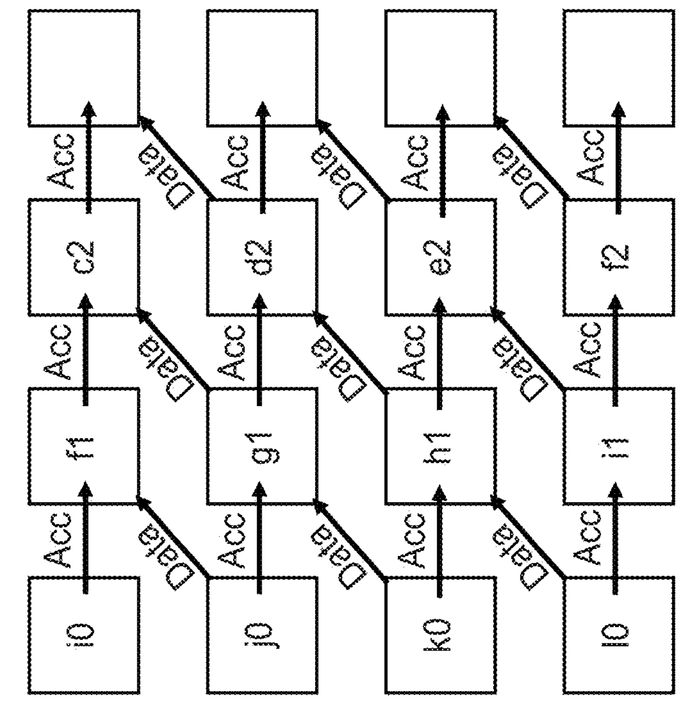
FIG. 10
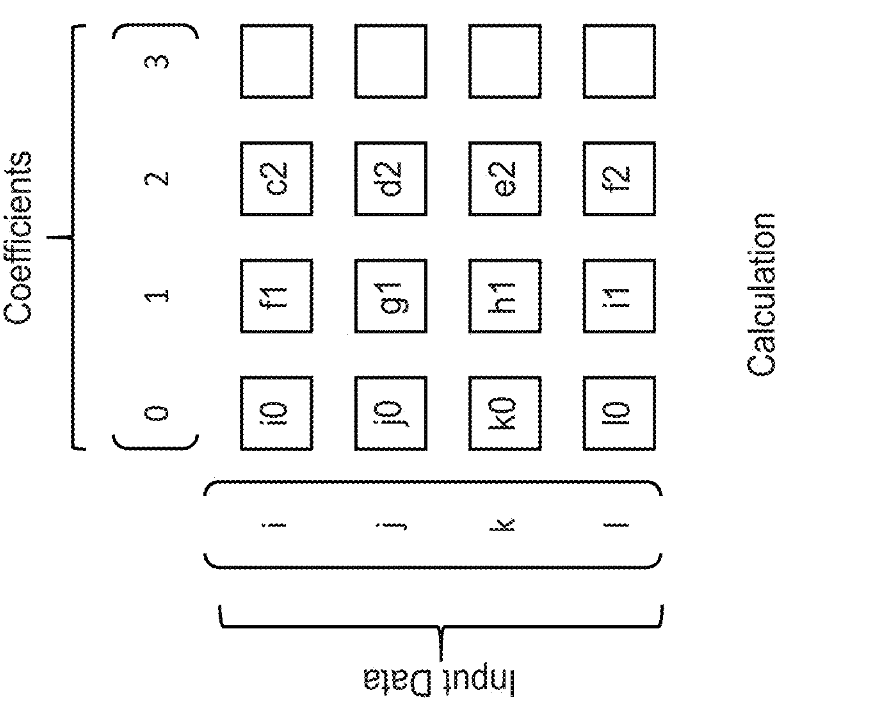

DATA PROCESSING ARRAY

TECHNICAL FIELD

The present disclosure relates to data processing. In particular, the present disclosure relates to a two-dimensional array of processing elements.

DESCRIPTION

A data processing apparatus may be provided with a two-dimensional array of processing elements, for example to support the performance of matrix operations such as outer product calculations.

SUMMARY

In one example embodiment described herein there is an apparatus comprising:

array storage circuitry configured to hold multiple two-dimensional arrays of data elements; and a two-dimensional array of processing elements, wherein array dimensions of the two-dimensional array of processing elements correspond to array dimensions of the multiple two-dimensional arrays of data elements, wherein:

a first two-dimensional array of data elements provides data values for processing by the two-dimensional array of processing elements, and a second two-dimensional array of data elements provides control values to control processing performed by the two-dimensional array of processing elements, wherein each processing element of the two-dimensional array of processing elements is configured to perform a selected data processing operation and a selection of the selected data processing operation is controlled by a corresponding operation control value in the second two-dimensional array of data elements, wherein the two-dimensional array of processing elements is configured to have a data flow direction across the two-dimensional array of processing elements, and the data flow direction proceeds from a starting set of processing elements of the two-dimensional array of processing elements, and wherein, for each processing element not in the starting set of processing elements, the selected data processing operation takes as an operand a respective data value provided by a neighbouring data element of the first two-dimensional array of data elements and a selection of the neighbouring processing element is controlled by a corresponding source control value in the second two-dimensional array of data elements.

In one example embodiment described herein there is a computer program for controlling a host data processing apparatus to provide an instruction execution environment, the computer program comprising:

array storage program logic configured to hold multiple two-dimensional arrays of data elements; and program logic providing a two-dimensional array of processing elements, wherein array dimensions of the two-dimensional array of processing elements correspond to array dimensions of the multiple two-dimensional arrays of data elements, wherein:

a first two-dimensional array of data elements provides data values for processing by the two-dimensional array of processing elements, and a second two-dimensional array of data elements provides control values to control processing performed by the two-dimensional array of processing elements, wherein each processing element of the two-dimensional array of processing elements is configured to perform a selected data processing operation and a selection of the selected data processing operation is controlled by a corresponding operation control value in the second two-dimensional array of data elements, wherein the two-dimensional array of processing elements is configured to have a data flow direction across the two-dimensional array of processing elements, and the data flow direction proceeds from a starting set of processing elements of the two-dimensional array of processing elements, and wherein, for each processing element not in the starting set of processing elements, the selected data processing operation takes as an operand a respective data value provided by a neighbouring data element of the first two-dimensional array of data elements and a selection of the neighbouring processing element is controlled by a corresponding source control value in the second two-dimensional array of data elements.

In one example embodiment described herein there is a method comprising:

providing array storage configured to hold multiple two-dimensional arrays of data elements;

providing a two-dimensional array of processing elements, wherein array dimensions of the two-dimensional array of processing elements correspond to array dimensions of the multiple two-dimensional arrays of data elements, wherein:

a first two-dimensional array of data elements provides data values for processing by the two-dimensional array of processing elements, and a second two-dimensional array of data elements provides control values to control processing performed by the two-dimensional array of processing elements;

performing, in each processing element of the two-dimensional array of processing elements, a selected data processing operation;

controlling a selection of the selected data processing operation by a corresponding operation control value in the second two-dimensional array of data elements, wherein the two-dimensional array of processing elements is configured to have a data flow direction across the two-dimensional array of processing elements, and the data flow direction proceeds from a starting set of processing elements of the two-dimensional array of processing elements, and wherein, for each processing element not in the starting set of processing elements, the selected data processing operation takes as an operand a respective data value provided by a neighbouring data element of the first two-dimensional array of data elements; and controlling a selection of the neighbouring processing element by a corresponding source control value in the second two-dimensional array of data elements.

BRIEF DESCRIPTION OF THE DRAWINGS

The present invention will be described further, by way of example only, with reference to embodiments thereof as illustrated in the accompanying drawings, in which:

FIGS. 8-12 schematically illustrate data movement and data processing in a two-dimensional array of processing elements taking input vectors of data and using a vector of processing coefficients through sequential data processing cycles in accordance with some examples;

DESCRIPTION OF EXAMPLE EMBODIMENTS

Figure 1:
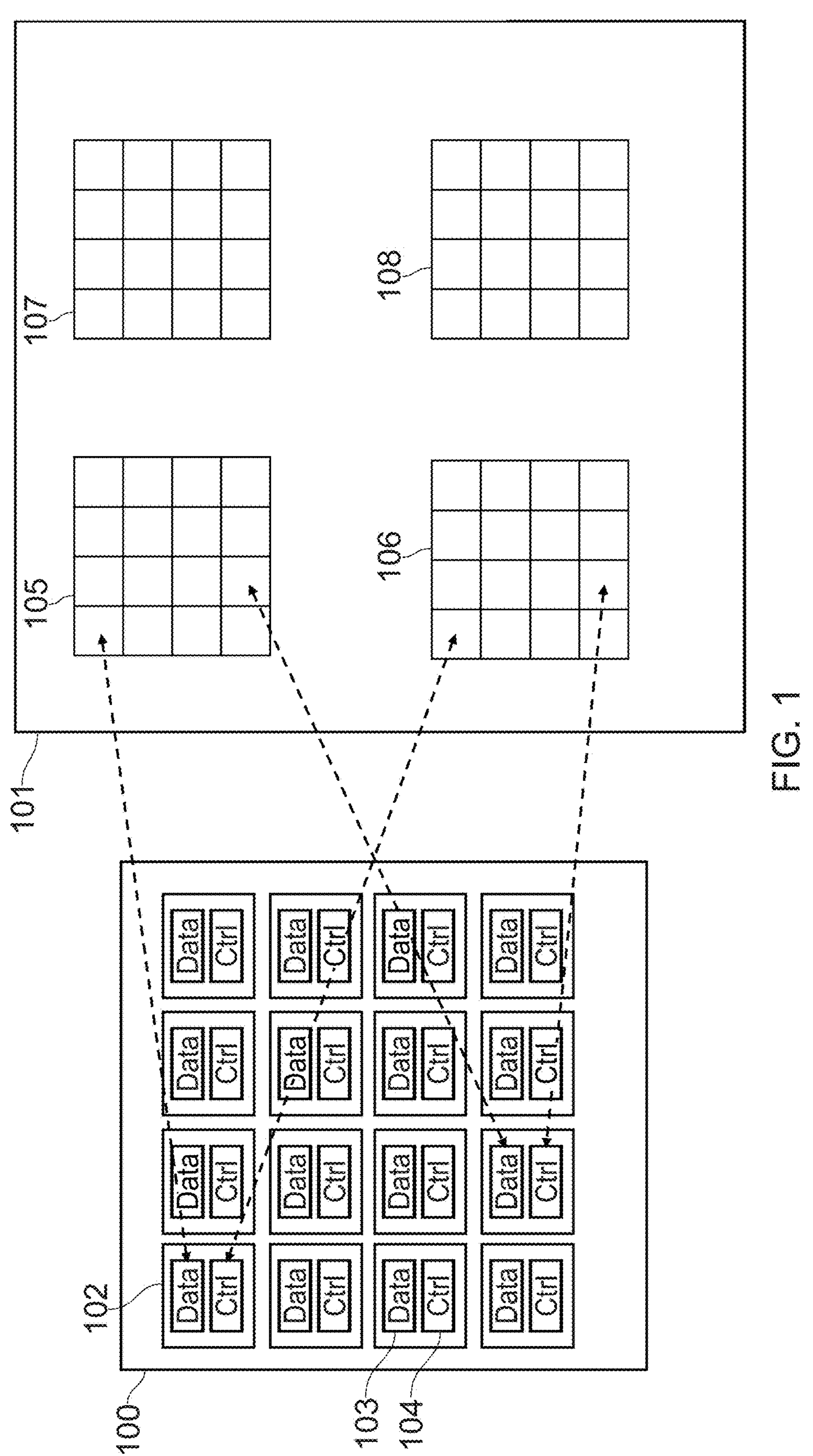
FIG. 1 schematically illustrates a two-dimensional array of processing elements and array storage circuitry in accordance with some examples.

Before discussing the embodiments with reference to the accompanying figures, the following description of embodiments is provided.

In accordance with one example configuration there is provided an apparatus comprising:

array storage circuitry configured to hold multiple two-dimensional arrays of data elements; and a two-dimensional array of processing elements, wherein array dimensions of the two-dimensional array of processing elements correspond to array dimensions of the multiple two-dimensional arrays of data elements, wherein:

a first two-dimensional array of data elements provides data values for processing by the two-dimensional array of processing elements, and a second two-dimensional array of data elements provides control values to control processing performed by the two-dimensional array of processing elements, wherein each processing element of the two-dimensional array of processing elements is configured to perform a selected data processing operation and a selection of the selected data processing operation is controlled by a corresponding operation control value in the second two-dimensional array of data elements, wherein the two-dimensional array of processing elements is configured to have a data flow direction across the two-dimensional array of processing elements, and the data flow direction proceeds from a starting set of processing elements of the two-dimensional array of processing elements, and wherein, for each processing element not in the starting set of processing elements, the selected data processing operation takes as an operand a respective data value provided by a neighbouring data element of the first two-dimensional array of data elements and a selection of the neighbouring processing element is controlled by a corresponding source control value in the second two-dimensional array of data elements.

The present techniques enable a two-dimensional array of processing elements to be flexibly and freely configured and programmed. The data processing performed by each processing element of the two-dimensional array of processing elements is specified by the content of corresponding two-dimensional arrays of data elements held by the array storage circuitry. The two-dimensional arrays of data elements "correspond to" the two-dimensional array of processing elements in that the dimensions of the two-dimensional arrays of data elements are the same as the dimensions of the two-dimensional array of processing elements. For example, where the two-dimensional array of processing elements comprises 4×4 processing elements, the two-dimensional arrays of data elements are also provided in a (logical) 4×4 form. A 16×16 array of processing elements will be controlled by the content of 16×16 two-dimensional arrays of data elements, and so on. In particular, a first two-dimensional array of data elements provides data values that are the subject of the processing by the two-dimensional array of processing elements, whilst a second two-dimensional array of data elements provides control values that control the processing performed by the two-dimensional array of processing elements. The two-dimensional array of processing elements has a data flow direction across the two-dimensional array of processing elements, whereby a given processing element receives an operand data value from a neighbouring processing element and passes the result of its data processing operation on to a neighbouring processing element, such that processed data flows across the array. The selection of the neighbouring processing elements from which and to which data values move for a given processing element is controlled by a corresponding source control value in one of the two-dimensional arrays of data elements. As a result, by the choice of data values in the two-dimensional arrays of data elements, the programmer can freely control the processing operation performed by each processing element of the two-dimensional array of processing elements and how the processed data moves from processing element to processing element as it flows across the array. As such, the two-dimensional array of processing elements is provided as a "systolic array" and can be used to implement a range of multi-element data processing operations such as matrix operations and convolution operations, which may find applicability in a wide range of fields. Moreover, where the movement of the data values across the array of processing elements takes place using the multiple two-dimensional arrays of data elements, this avoids the use of memory accesses to perform the required permutes of data values, thus saving memory bandwidth. It should be understood for the purposes of the present disclosure that references to "two-dimensional" and "arrays" are to understood in a logical sense, i.e. defining a relationship between individual processing elements and data elements, and there is no limitation implied on any physical layout of the circuitry of the array of processing elements or the array storage circuitry.

In some examples, the apparatus further comprises:

vector register circuitry configured to hold vectors of data elements, wherein a vector of data elements corresponds to a single array dimension of each of the multiple two-dimensional arrays of data elements, and wherein the apparatus is configured to:

provide a selected input vector of data elements as input data for processing by the two-dimensional array of processing elements; and/or receive in a selected output vector of data elements processed data from the two-dimensional array of processing elements.

The vectors of data elements thus correspond in size to a single array dimension of each of the multiple two-dimensional arrays of data elements, such that a given vector either matches a row size or a column size of two-dimensional arrays of data elements. In this way, the vectors are appropriately sized to provide input data for processing by the two-dimensional array of processing elements, on the assumption that a full "side" of the two-dimensional array should have its processing elements simultaneously be provided with a set of input data values. This is not essential however, since a variety of data flows across the two-dimensional array of processing elements is supported including, to take just one illustrative example, a configuration in which only one processing element on an input side of the array is provided with an initial input data value, and the processed data then spreads out as it crosses the array. Similarly a full side of input data could equally be processed in traversing the array, such that, say, a single output value at the opposite side results. Any other permutation of widening, narrowing, and/or varying data front width is also contemplated.

The apparatus can be configured to interpret the control values of the second two-dimensional array of data elements in a great variety of ways, as best suits a particular implementation of these techniques. However, in some examples the two-dimensional array of processing elements is configured to interpret the control values of the second two-dimensional array of data elements in a bitwise manner, wherein each bit of a control value has a defined semantic meaning for controlling the processing performed by the two-dimensional array of processing elements. Accordingly this provides a flexibly configurable system in which any aspect of the processing performed can be controlled by the setting of a corresponding bit in a control values in a data element of the second two-dimensional array, whether this is the source of a data operand, the particular data processing operation to be performed, the destination of a resulting data value, or any other aspect of the processing performed.

In some examples, two bits of the corresponding source control value respectively identify corresponding data elements of the selected input vector of data elements. Thus, when an input vector of data elements is used, corresponding data elements of that input vector (corresponding to the particular processing element in the array), can be selected, for example where one bit corresponds to an input row vector and one bit corresponds to an input column vector.

In some examples, the apparatus is configured to provide the selected input vector of data elements as the input data for processing by the starting set of processing elements. Thus this input vector of data elements can be the initial subject of the processing, following which a wave of data processing then traverses the array.

In some examples, the apparatus is configured to provide the selected input vector of data elements as the input data for processing to respective processing elements of a sequence of processing elements in the data flow direction. In this manner the input vector of data elements can be provided as a set of respective coefficients which are applied by respective processing elements in sequence as the processing traverses the array.

The apparatus can in principle be configured such that any processing element of the two-dimensional array of processing elements can receive a data value as an input data operand from any neighbouring processing element. However, in some examples, the apparatus is configured such that, for each processing element of the two-dimensional array of processing elements, the neighbouring data element of the first two-dimensional array of data elements is not further in the data flow direction. This facilitates the organisation and administration of the data processing, if data movement in the array is restricted to being generally in the data flow direction and at most in a direction perpendicular to the data flow direction, such that no data values move against the data flow direction.

The array storage circuitry can in principle hold any plural number of two-dimensional arrays of data elements, and in some examples at least one further two-dimensional array of data elements provides at least one further set of data values for processing in combination with the data values provided by the first two-dimensional array of data elements. This provides yet further flexibility and configurability as to the data processing that the two-dimensional array of processing elements can perform.

The operation control values and the source control values may be provided in a variety of ways, but in some examples the corresponding operation control value in the second two-dimensional array of data elements and the corresponding source control value in the second two-dimensional array of data elements comprise respective first and second portions of a corresponding control value in the second two-dimensional array of data elements. Thus, one part of a control value held by a data element of the second two-dimensional array of data elements can provide the operation control (i.e. the selection of the processing to be performed by the corresponding processing element), whilst another part of the control value held by that data element can provide the source control (i.e. the selection of the of the neighbouring processing element which will provide the operand data value for the selected data processing operation).

In examples in which the two-dimensional array of processing elements is configured to interpret the control values of the second two-dimensional array of data elements in a bitwise manner, wherein each bit of a control value has a defined semantic meaning for controlling the processing performed by the two-dimensional array of processing elements, the various bits of the control value can be used in a variety of ways to indicate where an operand data value it to come from. In some examples five bits of the corresponding source control value respectively identify five neighbouring data elements of the first two-dimensional array of data elements that are not further in the data flow direction. In a square grid configuration of the array, these five neighbours are then: one above; one to the side; one below; one above and to the side; and one below and to the side. In some such bitwise interpreted examples, for each processing element of the two-dimensional array of processing elements, one bit of the corresponding source control value indicates that processing element should use as an operand its own corresponding data element from one of the two-dimensional arrays of data elements.

The control of the operation of the two-dimensional array of processing elements and the array storage circuitry may take a variety of forms, but in some examples the apparatus further comprises instruction decoding circuitry configured to decode data processing instructions and to generate control signals to control operation of the apparatus as determined by the data processing instructions. A programmable apparatus which is programmed by the supplied data processing instructions is thus provided.

In some examples, the instruction decoding circuitry is responsive to an array processing instruction specifying the first two-dimensional array of data elements and the second two-dimensional array of data elements to generate the control signals to cause:

- selected operands for the selected data processing operations for the two-dimensional array of processing elements to be provided to the respective processing elements; and
- the respective processing elements of the two-dimensional array of processing elements to perform the selected data processing operations.

The provision of the array processing instruction thus provides the programmer with a direct and easily configurable manner of controlling the data processing operations performed by the two-dimensional array of processing elements.

Other varieties of related instructions may also be provided for the use of the programmer. In some examples the instruction decoding circuitry is responsive to an operand provision instruction specifying the first two-dimensional array of data elements to cause:

selected operands for the selected data processing operations for the two-dimensional array of processing elements to be provided to the respective processing elements.

In some examples, the instruction decoding circuitry is responsive to an array operation instruction specifying the second two-dimensional array of data elements to cause:

- the respective processing elements of the two-dimensional array of processing elements to perform the selected data processing operations.

Accordingly the operand provision instruction and the array operation instruction in combination provide the same functionality as the array processing instruction, but may be usefully provided as two distinct instructions, allowing yet further configurability and usage possibilities for the two-dimensional array of processing elements.

The two-dimensional array of processing elements may perform any data processing operations, but in some examples the selected data processing operation is a multiply operation. In some examples the selected data processing operation is a fused multiply-accumulate operation.

In accordance with one example configuration there is provided a computer program for controlling a host data processing apparatus to provide an instruction execution environment, the computer program comprising:

- array storage program logic configured to hold multiple two-dimensional arrays of data elements; and
- program logic providing a two-dimensional array of processing elements, wherein array dimensions of the two-dimensional array of processing elements correspond to array dimensions of the multiple two-dimensional arrays of data elements, wherein:
- a first two-dimensional array of data elements provides data values for processing by the two-dimensional array of processing elements, and
- a second two-dimensional array of data elements provides control values to control processing performed by the two-dimensional array of processing elements,
- wherein each processing element of the two-dimensional array of processing elements is configured to perform a selected data processing operation and a selection of the selected data processing operation is controlled by a corresponding operation control value in the second two-dimensional array of data elements,
- wherein the two-dimensional array of processing elements is configured to have a data flow direction across the two-dimensional array of processing elements, and the data flow direction proceeds from a starting set of processing elements of the two-dimensional array of processing elements,
- and wherein, for each processing element not in the starting set of processing elements, the selected data processing operation takes as an operand a respective data value provided by a neighbouring data element of the first two-dimensional array of data elements and a selection of the neighbouring processing element is controlled by a corresponding source control value in the second two-dimensional array of data elements.

In accordance with one example configuration there is provided a method comprising:

- providing array storage configured to hold multiple two-dimensional arrays of data elements;
- providing a two-dimensional array of processing elements, wherein array dimensions of the two-dimensional array of processing elements correspond to array dimensions of the multiple two-dimensional arrays of data elements, wherein:
- a first two-dimensional array of data elements provides data values for processing by the two-dimensional array of processing elements, and
- a second two-dimensional array of data elements provides control values to control processing performed by the two-dimensional array of processing elements;
- performing, in each processing element of the two-dimensional array of processing elements, a selected data processing operation;
- controlling a selection of the selected data processing operation by a corresponding operation control value in the second two-dimensional array of data elements,
- wherein the two-dimensional array of processing elements is configured to have a data flow direction across the two-dimensional array of processing elements, and the data flow direction proceeds from a starting set of processing elements of the two-dimensional array of processing elements,
- and wherein, for each processing element not in the starting set of processing elements, the selected data processing operation takes as an operand a respective data value provided by a neighbouring data element of the first two-dimensional array of data elements; and
- controlling a selection of the neighbouring processing element by a corresponding source control value in the second two-dimensional array of data elements.

Particular embodiments will now be described with reference to the figures.

FIG. 1 schematically illustrates a two-dimensional array of processing elements 100 and an array storage 101 in accordance with some examples. The two-dimensional array of processing elements 100 is formed of multiple processing elements 102, in a logical grid-like arrangement. Each of the processing elements 102 is configured to perform a data processing operation on a data value 103, whereby the selection of the data processing operation performed is controlled by a control value 104. Associated with the two-dimensional array of processing elements 100 is the array storage 101, which stores multiple two-dimensional arrays of data elements 105, 106, 107, 108. The two-dimensional arrays of data elements 105 have the same dimensions as the two-dimensional array of processing elements 100. In the illustrated example, each has a 4×4 configuration, but the present techniques are not limited to any particular array sizes and indeed many implementations of the present techniques may use larger array sizes, such as 16×16. The 4×4 example here is chosen purely for simplicity and clarity of illustration and discussion. Equally the array storage 101 may store any plural number of two-dimensional arrays of data elements and a set of four in the figure is also merely for clarity of illustration and discussion. The correspondence of the dimensions of the two-dimensional array of processing elements 100 with the dimensions of the two-dimensional arrays of data elements 105 supports a straightforward correspondence between individual processing elements of the former with individual data elements of the latter. A first two-dimensional array of data elements 105 provides respective data values for use in the processing by the respective processing elements of the array 100, and the figure shows two example correspondences. A second two-dimensional array of data elements 106 provides respective control values to control processing performed by respective processing elements the array 100, and the figure shows two example correspondences. The control values not only dictate the particular data processing operation performed by each processing element, but also the data flows, i.e. where one or more source operands for each processing element will come from and to where a result value of each data processing operation performed will be provided. Accordingly, by the setting of appropriate data values in the multiple two-dimensional arrays of data elements 105, 106, 107, 108, the data processing of the array 100 as whole can be configured, as well as the data flow of data values traversing it.

Figure 2:
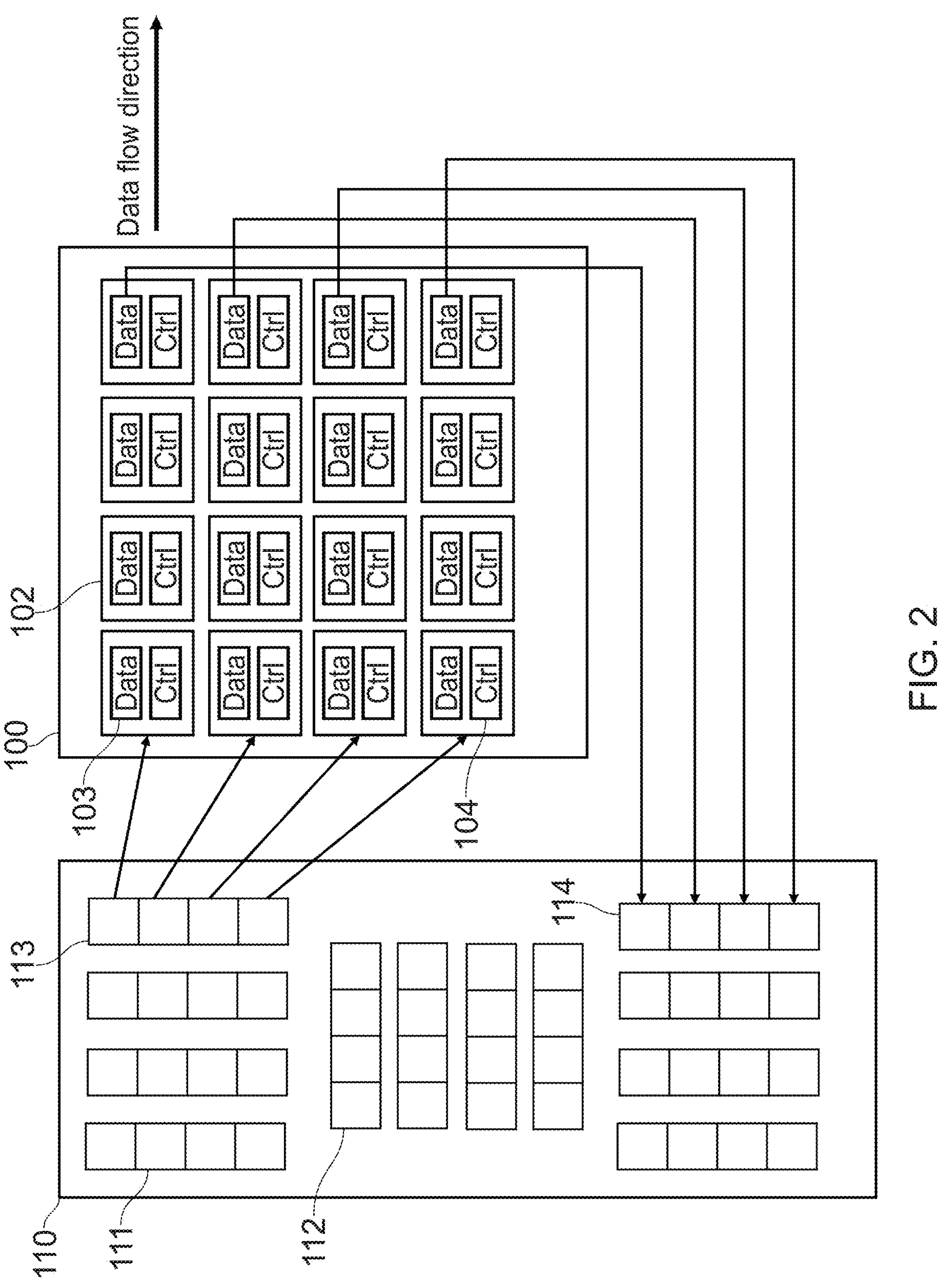
FIG. 2 schematically illustrates vector register circuitry and a two-dimensional array of processing elements in accordance with some examples.

FIG. 2 schematically illustrates vector register circuitry 110 and a two-dimensional array of processing elements 100 in accordance with some examples. As described in connection with FIG. 1, the two-dimensional array of processing elements 100 is formed of multiple processing elements 102, in a logical grid-like arrangement. Each of the processing elements 102 is configured to perform a data processing operation on a data value 103, whereby the selection of the data processing operation performed is controlled by a control value 104. The vector register circuitry 110 is configured to hold vectors of data elements 111. At least some of the vectors of data elements correspond in size to a single array dimension of each of the multiple two-dimensional arrays of data elements 105, 106, 107, 108 (see FIG. 1) and thus also to a single dimension of the two-dimensional array of processing elements 100. This single dimension can be a horizontal or a vertical dimension (in the orientation shown in the figure) and to illustrate this some vectors (e.g. 111) are shown in a vertical, column-like orientation corresponding to the vertical dimension of the array 100 and some vectors (e.g. 112) are shown in a horizontal, row-like orientation corresponding to the horizontal dimension of the array 100. FIG. 2 illustrates the provision of a set of input data values to the array 100, where this set of input data values is provided by the vector 113. Similarly, FIG. 2 illustrates a set of output data values from the array 100 being passed to the vector 114. Thus, in general a vector 113 can provide a set of input values for processing by the two-dimensional array of processing elements 100, where these input values are provided to the respective processing elements of a starting set of processing elements of the two-dimensional array of processing elements. Data then traverse the array 100, being processed by the processing elements on the way, where the processing performed and the movement of the data values is controlled by control values held in respective data elements of a two-dimensional array 106. Note that the set of data values provided by the vector 113 may be distinct from the data values provided by the two-dimensional array of data elements 105, for example, where the two-dimensional array of data elements 105 provides a set of coefficients by which the input data values are multiplied as they traverse the array 100. Data that has traversed the array 100 can then provide a set of result values where these result values are thus taken from the respective processing elements of a finishing set of processing elements of the two-dimensional array of processing elements to populate a result vector 114.

Figure 3:
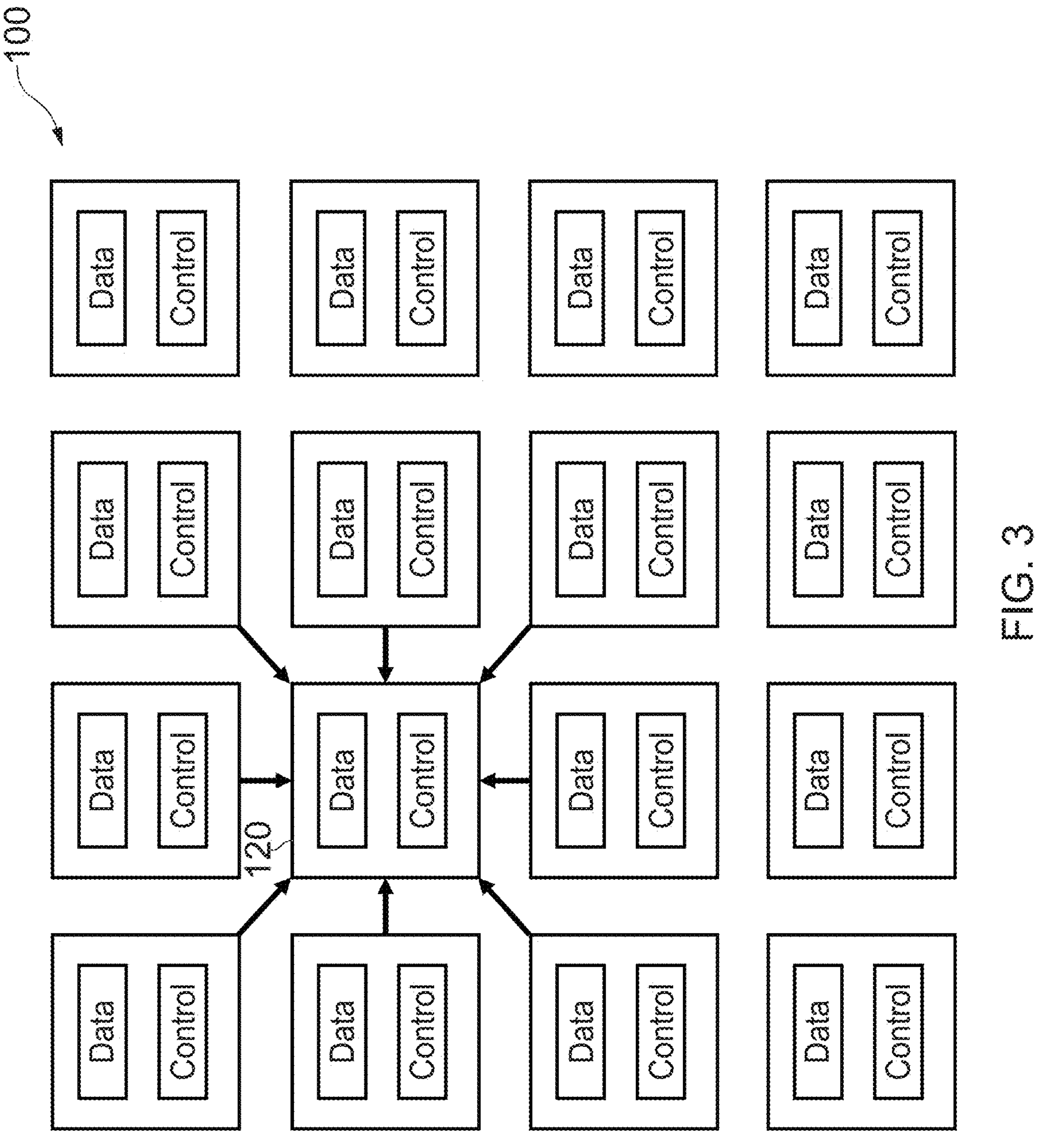
FIG. 3 schematically illustrates a two-dimensional array of processing elements in accordance with some examples.

FIG. 3 schematically illustrates a two-dimensional array of processing elements 100 in accordance with some examples and in particular a processing element 120 in the array, where the set of eight neighbouring processing elements surrounding it are shown as possible sources of data values to be passed to the processing element 120. Nevertheless, as discussed with respect to the figures that follow, a given processing element may be limited to receive input data values from less than all of the set of eight neighbouring processing elements to facilitate the establishment of a data flow direction across the array.

Figure 4:
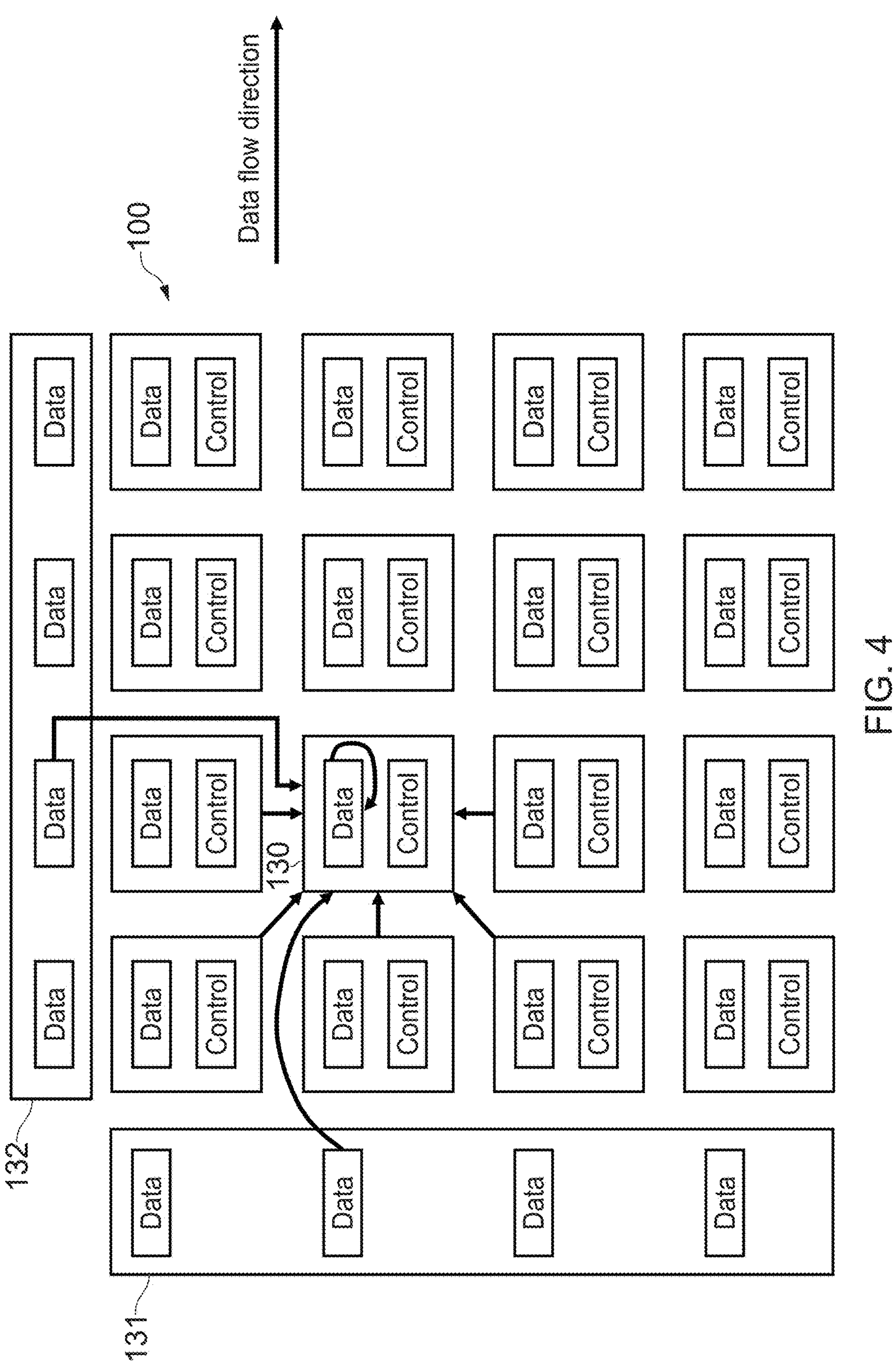
FIG. 4 schematically illustrates a two-dimensional array of processing elements being supplied by data operands two vectors in accordance with some examples.

FIG. 4 schematically illustrates a two-dimensional array of processing elements 100 being supplied by data operands from two vectors 131 and 132 in accordance with some examples. Vector 131 is positioned and orientated in the figure to highlight the correspondence between its data elements and the vertical dimension (as illustrated) of the array 100 and vector 132 is positioned and orientated in the figure to highlight the correspondence between its data elements and the horizontal dimension (as illustrated) of the array 100. A processing element 130 is the focus of the illustration of FIG. 4, showing possible sources of data operands for the data processing performed by this processing element. These sources may be viewed in three categories. In a first category are the above-mentioned vectors 131 and 132 and a data value being provided from a corresponding data element of each of these vectors 131 and 132 is shown. A second category is formed by a set of five neighbouring processing elements. Note in particular that not all neighbouring processing elements are therefore shown as possible sources of data operands for this processing element, in that the five neighbouring processing elements are only those which are not further than the processing element 130 in the data flow direction (shown in the figure as being from left to right). This restriction facilitates the data flow, since data is always generally moving in the data flow direction and there is no doubling back. The final third category is the processing element 130 itself, i.e. that the result value of the processing operation of this processing element can be a data operand for the next iteration of that processing operation.

Figure 5:
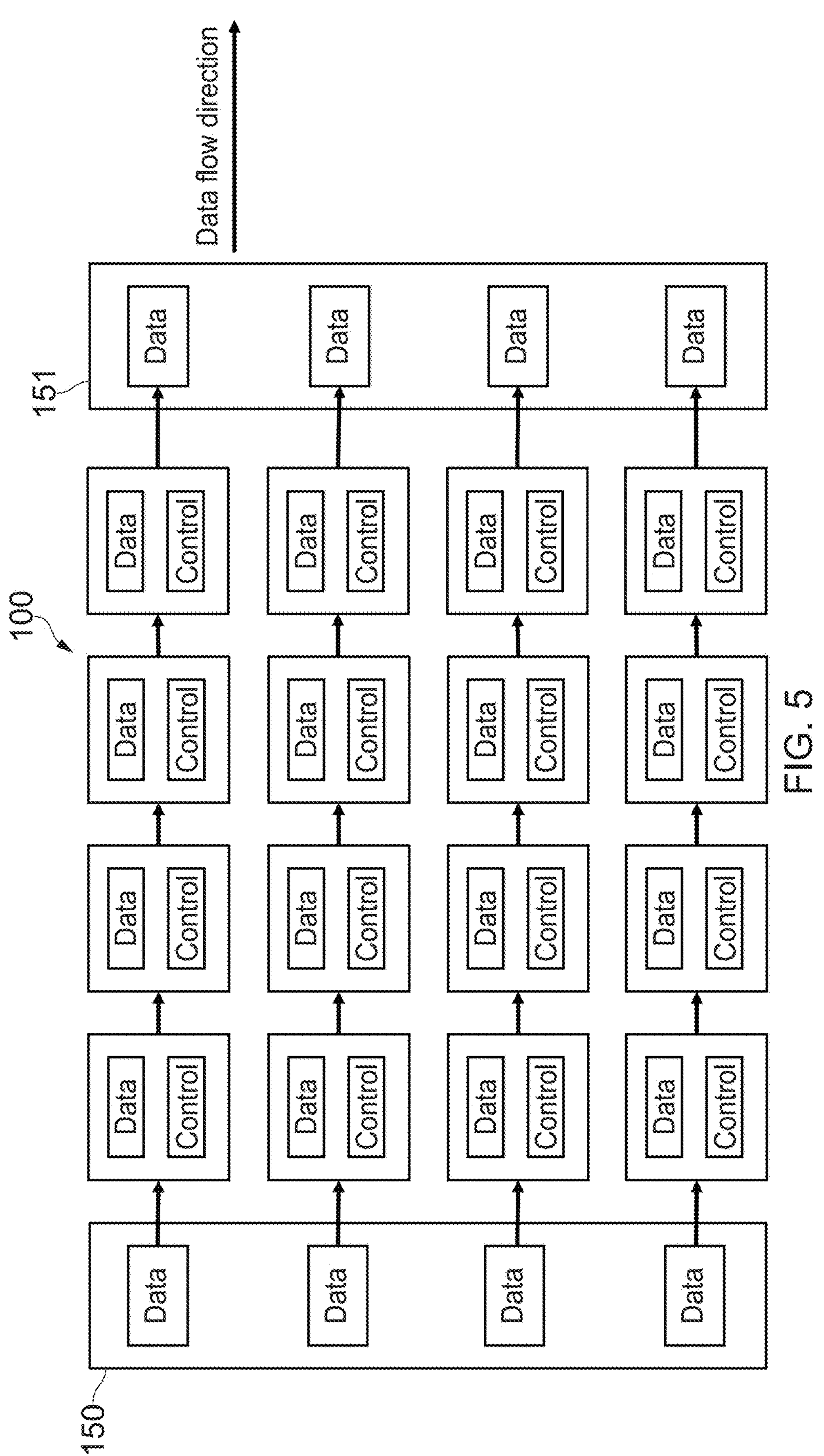
FIG. 5 schematically illustrates an example data flow from an input vector, through a two-dimensional array of processing elements, and to an output vector in accordance with some examples.

FIG. 5 schematically illustrates an example data flow from an input vector 150, through a two-dimensional array of processing elements 100, and to an output vector 151 in accordance with some examples. The data flow direction is labelled and it can be seen that a simple, left-to-right flow of data occurs, in which there is no branching or merging of the data flow (e.g. a single data value providing the input data value operand for more than one processing element or a single processing element having more than one input data value operand, where these come from more than one source processing element). Accordingly, in the illustrated example the data flows in four parallel lanes, each processing element in each lane performing a processing operation on a received data value and passing the forward the resulting data value. In each processing element, the processing performed is controlled by the local control value and may make use of a local data value, where these values are provided by respective data elements of two two-dimensional arrays of data elements in the array storage circuitry.

Figure 6:
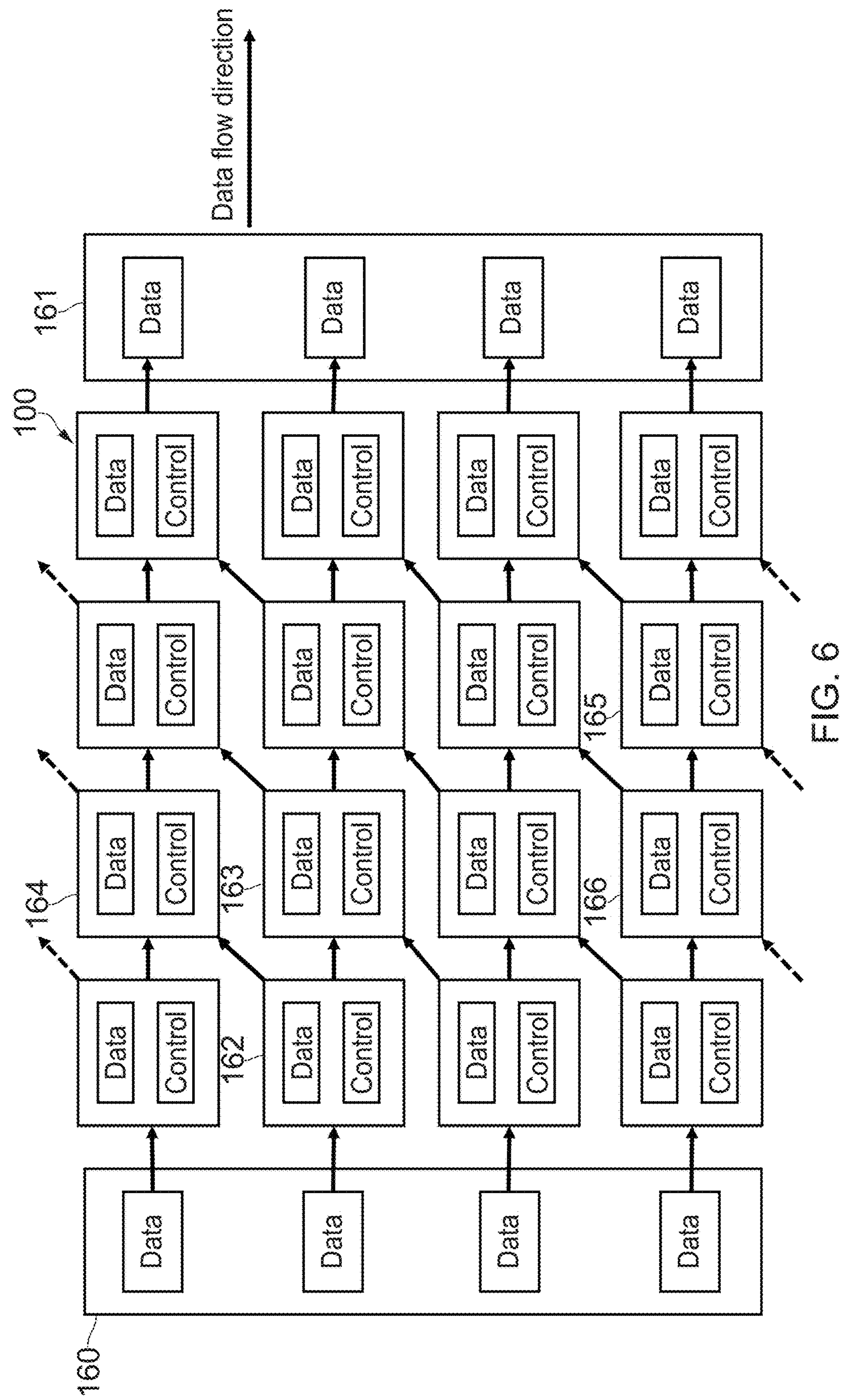
FIG. 6 schematically illustrates an example data flow from an input vector, through a two-dimensional array of processing elements, and to an output vector in accordance with some examples.

FIG. 6 schematically illustrates an example data flow from an input vector 160, through a two-dimensional array of processing elements 100, and to an output vector 161 in accordance with some examples. Although the overall data flow direction is the same at that of the example of FIG. 5, i.e. from left to right in the figure, this results from a slightly more complex passing of data values between the processing elements, namely that in this example data values from a given processing element are passed not only to the processing element directly to its right, but also to the processing element to its right, but displaced upwards by one processing element. For example, processing element 162 passes a data value to the processing element 163 directly to its right and also passes a data value to the processing element 164 to its right and up. There are exceptions to this general rule, such as the first column of processing elements (which includes processing element 162) that only receives data values from a corresponding data element in the input vector 160 and the last column of processing elements that only passes data values to a corresponding data element in the output vector 161. The passing of data values can also occur allowing for "wrap-around" in the array, such as is shown by the example of processing element 164 that can pass a data value to the processing element 165 (by virtue of the vertical dimension of the array wrapping around from the upper edge to the lower edge). Processing element 165 also receives a data value from the processing element 166. The flexibility to be configurable to perform such different data value passing means that the array of processing elements can be programmed to perform a great range of data processing operations.

Figure 7:
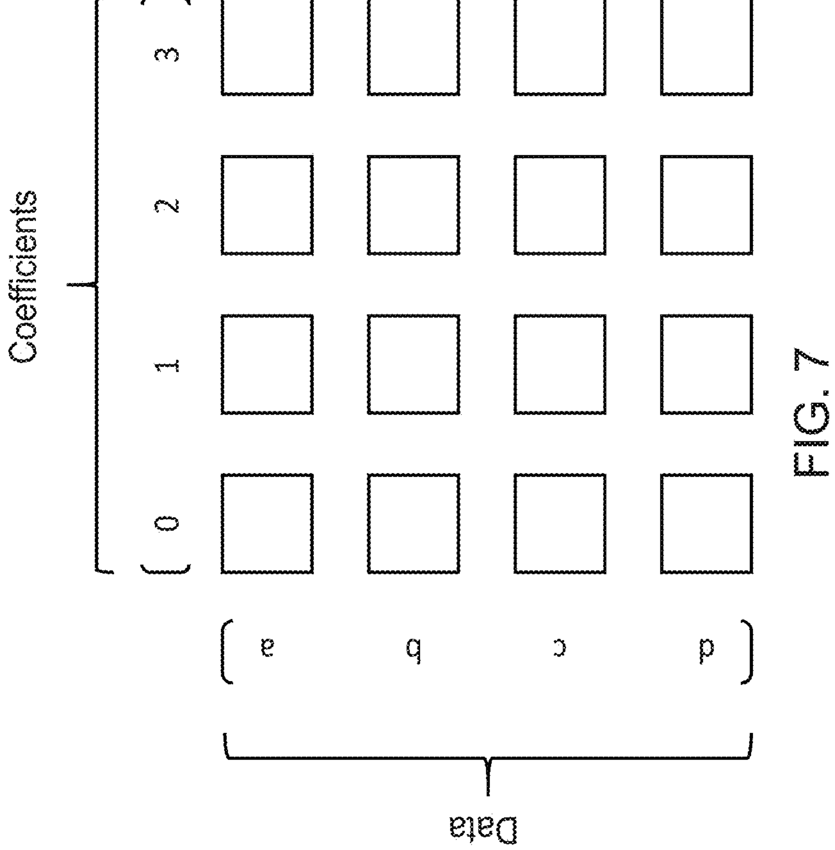
FIG. 7 schematically illustrates input data values and input coefficient values in association with a two-dimensional array of processing elements in accordance with some examples.

There follows a cycle-by-cycle description of a configuration in which the array of processing elements performs 1D 4×1 convolutions. These convolutions are performed on a sequence of data values: a, b, c, d, e, f . . . and the four convolutions apply the four respective coefficients {0, 1, 2, 3}. The end result of these convolutions, for a first iteration, will be {(a0+b1+c2+d3), (b0+c1+d2+e3), (c0+d1+e2+f3), (d0+e1+f2+g3)}. The manner in which the input data values and coefficients are mapped onto an array of processing elements is shown in FIG. 7, in which sets of the data values are provided as input values to the array (from the left as illustrated), and the coefficients are applied by all processing elements in the array on a row-by-row basis, i.e. the four respective processing elements in each row each apply a respective one of the coefficients {0, 1, 2, 3}.

A first cycle (cycle 0) of the convolutions performance is shown in FIG. 8. A first set of input data {a, b, c, d} is fed in from the left and the coefficients {0, 1, 2, 3} are applied in each row. In this first cycle, only the first column of processing elements perform data processing, applying the coefficient 0 to the set of input data {a, b, c, d} producing the result values {a0, b0, c0, d0}. For each new cycle, a new set of input data is fed in from the left, an accumulation data value is passed to the right, and a processed data value is passed up and right.

Figure 11:
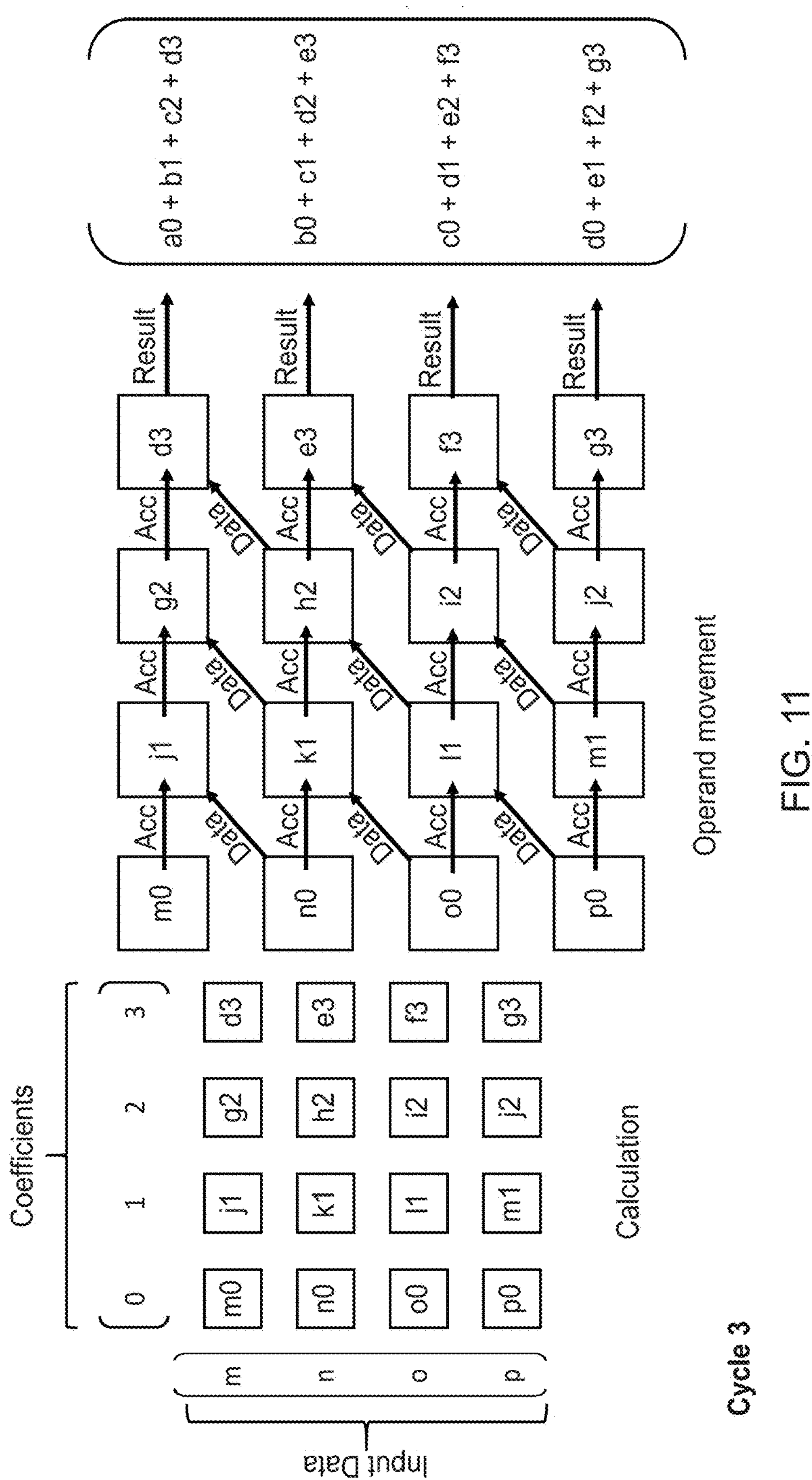

FIGS. 9-11 show the following three cycles (cycles 1, 2, and 3) as the processed data traverses the array, and new sets of input data a fed in from the left. The processing at cycle 3 completes the processing for the first set of input data {a, b, c, d} (although note that the next three sets of input data are also involved in the result set of data, by the nature of the convolution operations performed). The result values generated by the right-hand most (last) set of processing elements provide the output data set: {(a0+b1+c2+d3), (b0+c1+d2+e3), (c0+d1+e2+f3), (d0+e1+f2+g3)}.

Figure 12:
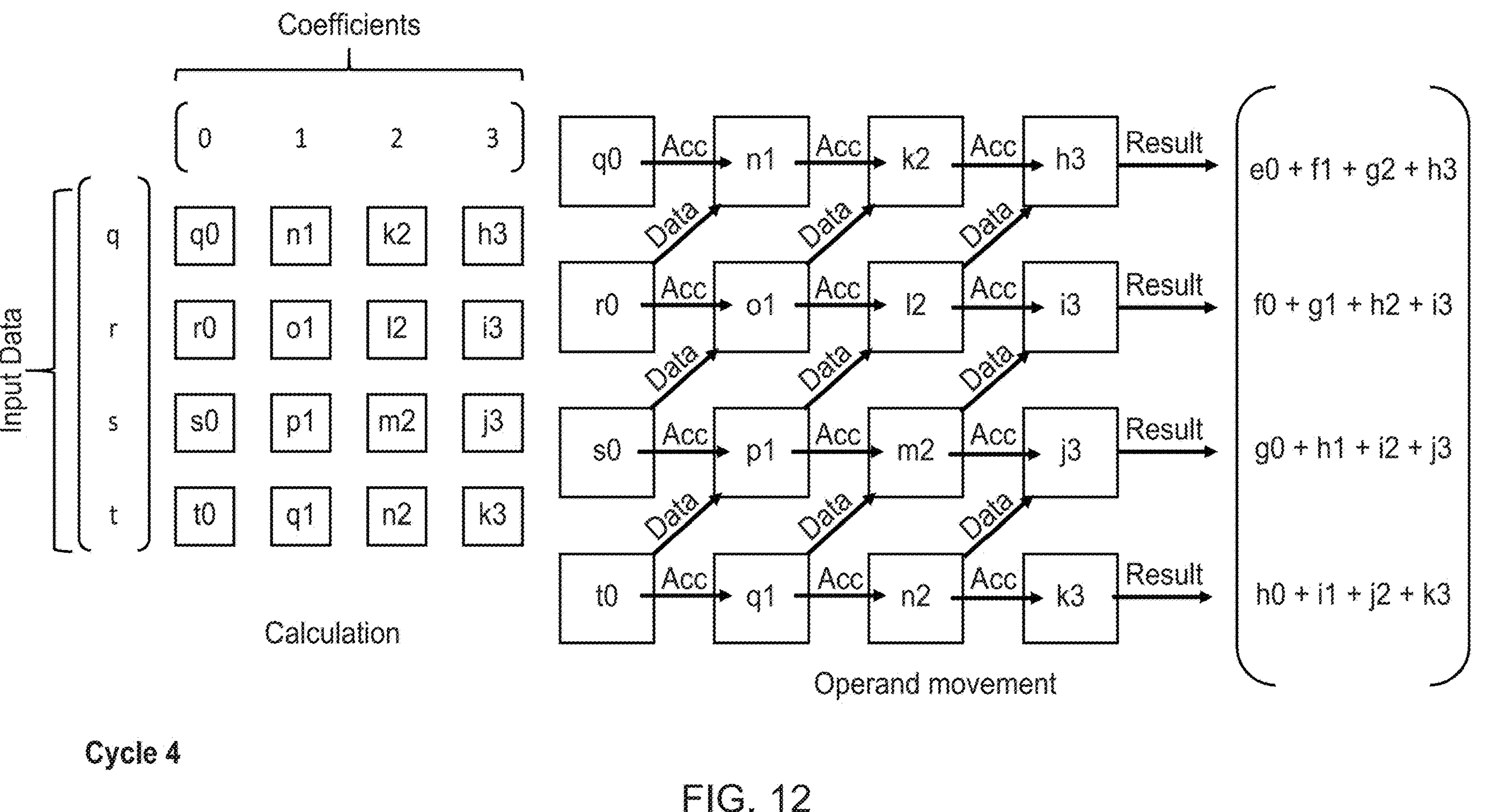

FIG. 12 show the processing of the next cycle (cycle 4), since the convolutions processing is a rolling, on-going process, which continues as long as new sets of input data are fed in to the array and fully traverse it. The next set of output data from this cycle is {(e0+f1+g2+h3), (f0+g1+h2+i3), (g0+h1+i2+j3), (h0+i1+j2+k3)}.

Figure 13:
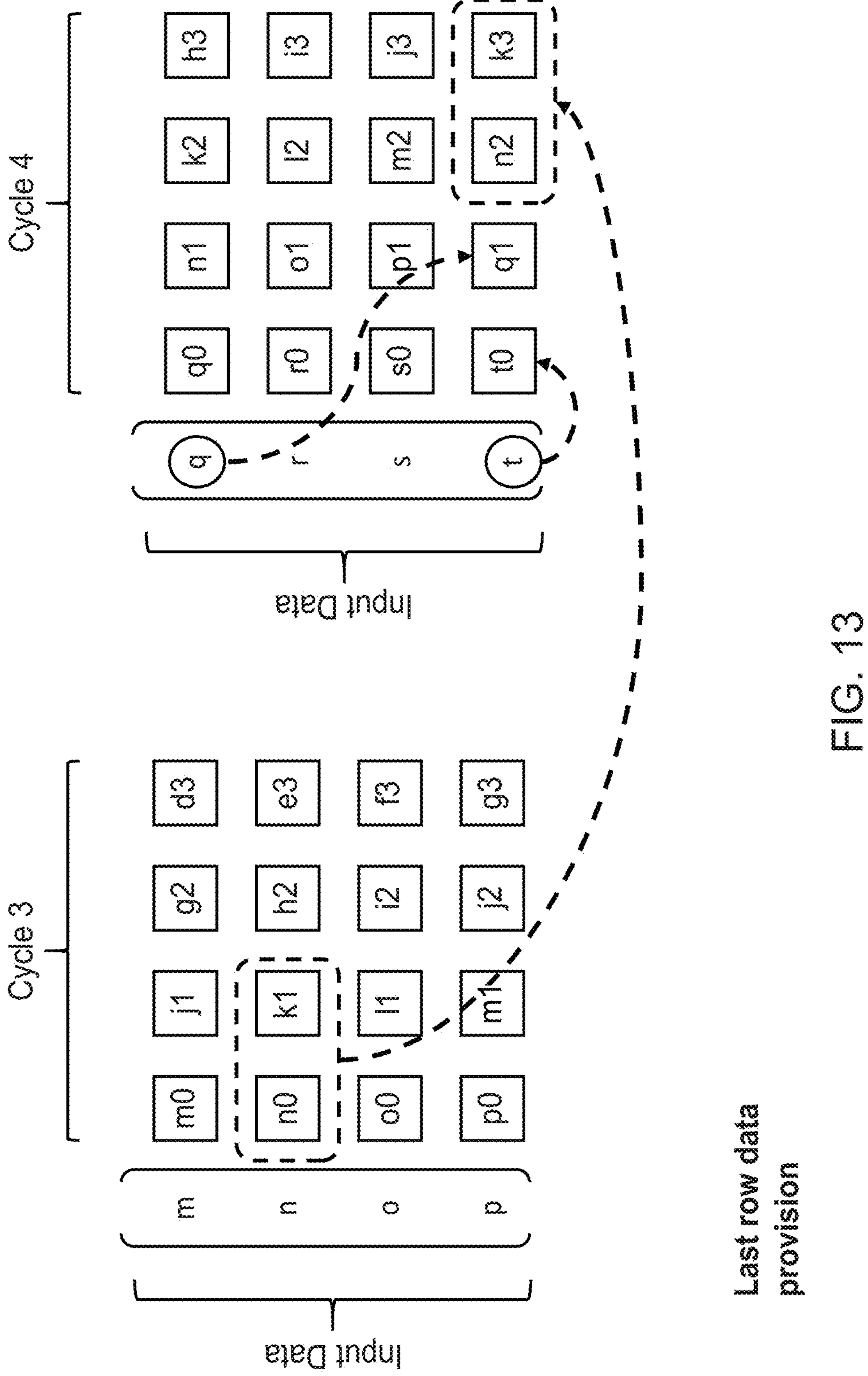
FIG. 13 schematically illustrates last row data provision in a two-dimensional array of processing elements in accordance with some examples.

The described convolution processing, in which data values progress right-wards and up-and-rightwards, means that in implementing the present techniques an approach is needed for providing the data values for processing by the bottom row of processing elements, since the source of these data values is not a nearby processing element. However, the inventor of the present techniques has realised that (in context of the 4×4 array of processing elements under discussion) the set of data values required for the bottom row of processing elements is given by the $2^{nd}$ row (from the top) at the previous iteration, displaced by two places (to the right). Accordingly, between each cycle of operations (as shown) this set of data values can be copied, with the two additional data values spliced onto it from the new input data set, and provided to the last row, as shown in FIG. 13.

Figure 14:
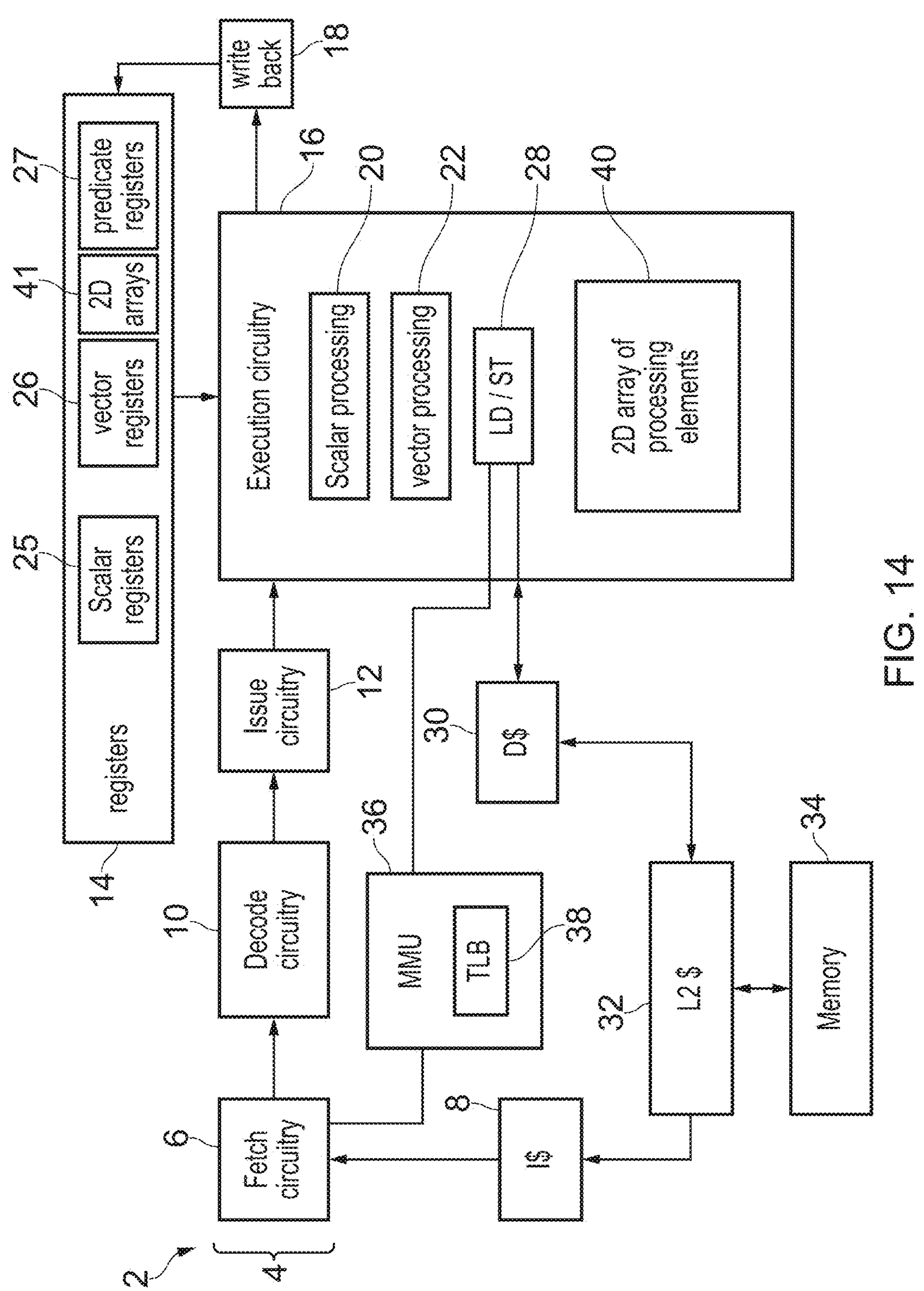
FIG. 14 schematically illustrates a data processing apparatus in accordance with some examples.

FIG. 14 schematically illustrates a data processing apparatus 2 implementing the present techniques in accordance with some examples. The data processing apparatus has a processing pipeline 4, which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline arrangement, and other systems may have additional stages or a different configuration of stages. For example, in an out-of-order processor a register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. These units comprise the two-dimensional array of processing elements (for example in the form of the two-dimensional array of processing elements 100 in the above-discussed examples). Further execution units may include a scalar processing unit 20 (e.g. comprising a scalar arithmetic/logic unit (ALU) 20 for performing arithmetic or logical operations on scalar operands read from the registers 14); a vector processing unit 22 for performing vector operations on vectors comprising multiple data elements; and a load/store unit 28 for performing load/store operations to access data in a memory system 8, 30, 32, 34. Other examples of processing units which could be provided at the execute stage could include a floating-point unit for performing operations involving values represented in floating-point format, or a branch unit for processing branch instructions.

The registers 14 include scalar registers 25 for storing scalar values, vector registers 26 for storing vector values, and predicate registers 27 for storing predicate values. The predicate values 27 may be used by the vector processing unit 22 when processing vector instructions, with a predicate value in a given predicate register indicating which data elements of a corresponding vector operand stored in the vector registers 26 are active data elements or inactive data elements (where operations corresponding to inactive data elements may be suppressed or may not affect a result value generated by the vector processing unit 22 in response to a vector instruction). The register circuitry 14 also comprises two-dimensional array storage 41, which is configured to hold multiple two-dimensional arrays of data elements. These two-dimensional arrays of data elements may be referred to as 'tiles' in some examples. Hence in such examples a first tile of data elements is used to provide data values for processing by the two-dimensional array of processing elements 40, whilst a second tile of data elements is sued to provide control values to control the processing performed by the two-dimensional array of processing elements 40. In some examples more than one tile provides provide data values for processing, such as when first, second, and third tiles provide data values for processing, whilst a fourth tile provides control values to control the processing performed.

A memory management unit (MMU) 36 controls address translations between virtual addresses (specified by instruction fetches from the fetch circuitry 6 or load/store requests from the load/store unit 28) and physical addresses identifying locations in the memory system, based on address mappings defined in a page table structure stored in the memory system. The page table structure may also define memory attributes which may specify access permissions for accessing the corresponding pages of the address space, e.g. specifying whether regions of the address space are read only or readable/writable, specifying which privilege levels are allowed to access the region, and/or specifying other properties which govern how the corresponding region of the address space can be accessed. Entries from the page table structure may be cached in a translation lookaside buffer (TLB) 38 which is a cache maintained by the MMU 36 for caching page table entries or other information for speeding up access to page table entries from the page table structure shown in memory.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline arrangement, and the processor may include many other elements not illustrated for conciseness.

In order to provide configurability of the operation of the two-dimensional array of processing elements 40, this disclosure also presents further instructions forming part of the instruction set that the decode circuitry 10 is configured to decode. In particular, these instructions comprise an array processing instruction. This array processing instruction firstly specifies a two-dimensional array of data elements that will provide the control of the processing performed by the two-dimensional array of processing elements 40 (this control including both the particular data processing operation to be performed by each processing element and the movement of the data values between processing elements). The array processing instruction also specifies at least one two-dimensional array of data elements that will provide the subject data values for the processing performed by the two-dimensional array of processing elements 40. The specification of these two-dimensional arrays of data elements may be explicit in the instruction format, but can also be implicit. For example in the 4-tile example of the 2D arrays 101, the array processing instruction may have a format that implicitly makes use of all four of these tiles. Furthermore, the array processing instruction can also specify one or more vectors, either as input vectors (providing data values or processing coefficients) or as a destination vector for processed data values. For example, the array processing instruction (AP_INST) can have the form:

AP_INST tile_set, input_vector_1, input_vector_2 where tile_set indicates a set of four tiles (such as the set 105-108 in the example of FIG. 1); input_vector_1 indicates a set of data values to form the input to the array of processing elements; and input_vector_2 indicates a set of coefficients to be used by the array of processing elements. An example of the operation of the array processing instruction is given below, where Z[m] specifies an input vector, Z[n] specifies an input vector, and tile[i] specifies a set of 2D arrays of data elements.

```
row_source = Z[m]
col_source = Z[n]
{for each row:
  {for each column:
    bits(32) A = tile[0, row, column]
    bits(32) B = tile[1, row, column]
    bits(32) C = tile[2, row, column]
    bits(32) D = tile[3, row, column]
  }
}
// Step 1 - move data
switch D[0:7]{
  case left:        A = tile[0, row−1, column]
  case left_up:     A = tile[0, row+1, column]
  case top:         A = tile[0, column−1, row]
  case bottom:      A = tile[0, column−1, row]
  case left_down:   A = tile[0, row−1, column]
  case row:         A = row_source[column]      // Z[m]
  case col:         A = col_source[row]         // Z[n]
  case keep:        A = A
}
switch D[8:15]{
  ...               // as above for B
}
switch D[16:23]{
  ...               // as above for C
}
```

-continued

```
switch D[24:31]{
    case fma:           operation = fp32__fma
    case mul:           operation = fp32__mul
    ...
}
// Step 2 - perform operation
switch operation:
```

-continued

```
    case fp32__fma:     A = A + B * C
    case fp32__mul:     A = B * C
...
```

In the above example operation of the array processing instruction it can be seen that the content of tile 0-3 is used in 32-bit words. This is of course an arbitrary choice for the purpose of the description here and the present techniques could be implemented using any other suitable word length. Further, it can be seen that the array of processing elements is treated as having an associated set of registers A, B, C, and D, these corresponding respectively to tiles 0, 1, 2, and 3. As such, each processing element has four associated registers. The D registers provide the respective control values for the processing elements, where the above example shows that each 32-bit D register value is interpreted in four 8-bit sections: the first defining the movement of the A register data values; the second defining the movement of the B register data values; the third defining the movement of the C register data values; and the fourth defining the processing operation to be performed by the processing elements. Moreover, each of these 8-bit sections is interpreted in a bit-wise fashion, with each bit having a meaning as shown above. Note that the data movements specified above correspond to the illustrated example of FIG. 4. The example processing operation to be performed by the processing elements shown above are a fused multiply-accumulate and a multiplication. Any other processing operation that can be performed by the processing elements can also be specified in this manner. The configuration of the D registers (for the control of the processing) may be provided as a constant with a given program to be executed on the apparatus, e.g. generated by a compiler from a high-level description of the required processing algorithm. Hence by providing a data processing apparatus 2 with a sequence of such array processing instructions, data can be processed and flow across the array of processing elements.

The present techniques further contemplate that array processing instruction could be sub-divided into two parts, corresponding to the "Step 1—move data" part and the "Step 2—perform operation" part of the above example. Accordingly, the instruction decoding circuitry can be further (or alternatively) configured to decode an operand provision instruction that specifies a two-dimensional array of data elements and causes selected operands to be provided to the respective processing elements, and be configured to decode an array operation instruction that specifies a two-dimensional array of data elements and causes respective processing elements of the two-dimensional array of processing elements to perform selected data processing operations.

As mentioned above, with reference to FIG. 13, in the case of a convolution algorithm being implemented by the array of processing elements, the provision of the last row of data values may require a further preparation step, and an example code sequence for this is:

```
  LD1W Z__COL__, [@input__1 + 0]        // Contiguous load of words to 32-bit
element ZA tile slice
  MOV Z1, ZA[1, 1]                      // Extract the 2nd row of data values from the last
iteration
  SPLICE Z__ROW__, Z0, Z1               // Form the row input with the data from the
array and the next iteration
  AP__INST ZA.s, Z__ROW, Z__COL
  ST1W ZA[0, 3] //                      Contiguous store of words from 32-bit element ZA tile
slice (last column of tile 0 has a vector of convolutions)
```

Figure 15:
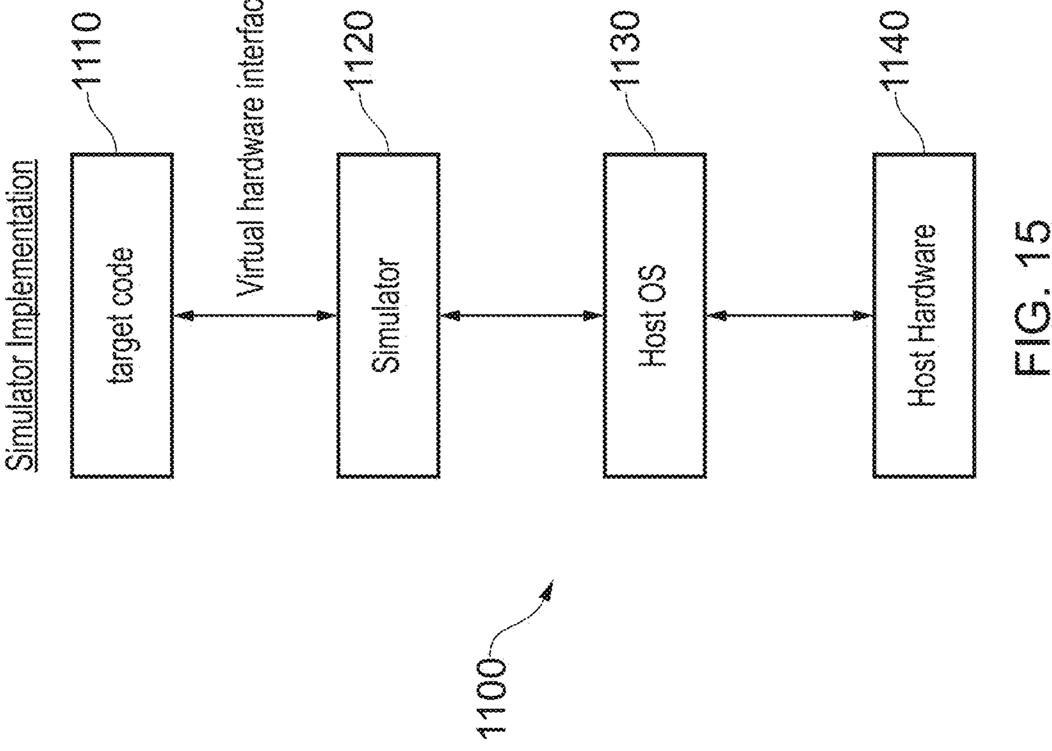
FIG. 15 schematically illustrates a simulator implementation in accordance with some examples.

FIG. 15 schematically illustrates a simulator implementation 1100 in accordance with some examples. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1140, optionally running a host operating system 1130, supporting the simulator program 1120. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1140), some simulated embodiments may make use of the host hardware, where suitable. The simulator program 1120 may be stored on a computer-readable storage medium (which may be a non-transitory medium), and provides a program interface (instruction execution environment) to the target code 1110 (which may include applications, operating systems and a hypervisor) which is the same as the interface of the hardware architecture being modelled by the simulator program 1120. Thus, the program instructions of the target code 1110 (such as the array processing instructions, operand provision instructions, and array operation instructions discussed above) may be executed from within the instruction execution environment using the simulator program 1120, so that a host computer 1140, which does not actually have the hardware features of the apparatus 2 discussed above, can emulate these features.

Figure 16:
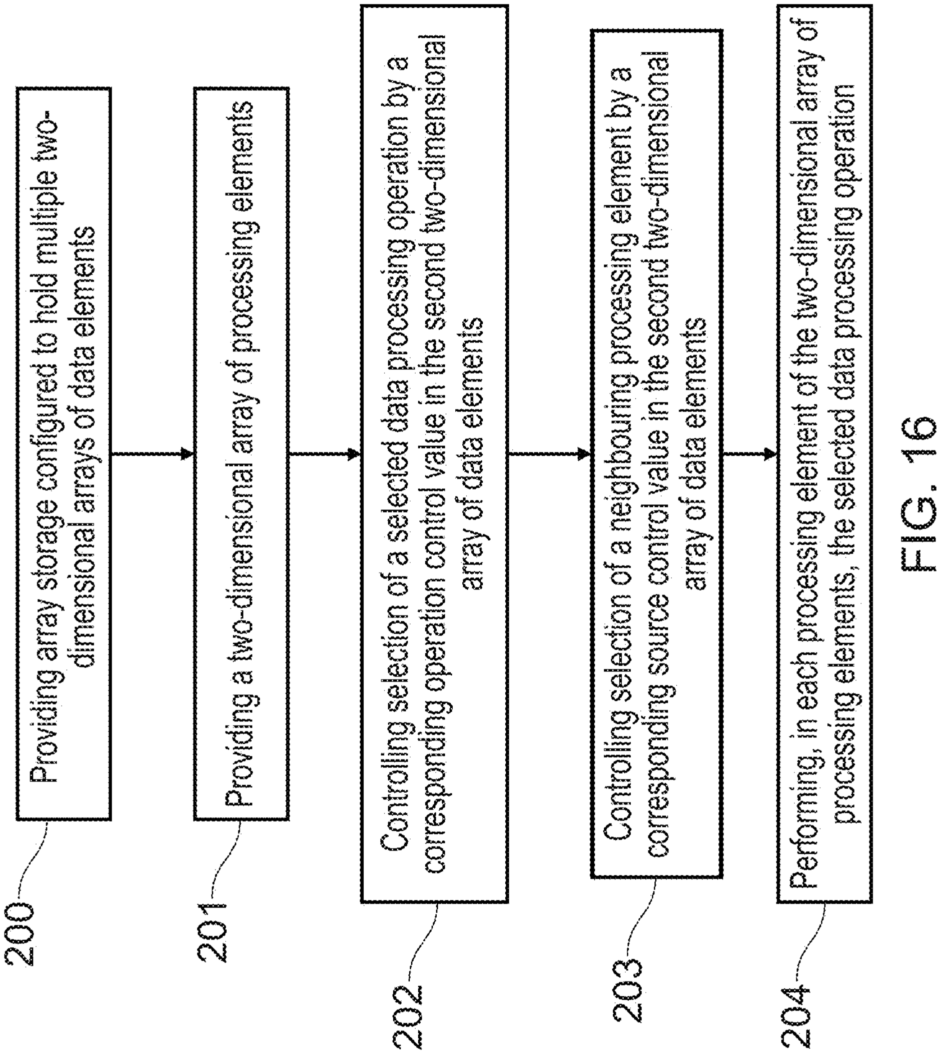
FIG. 16 shows a set of steps which are a taken when performing a method of some examples.

FIG. 16 shows a set of steps which are a taken when performing a method of some examples. The step 200 provides array storage configured to hold multiple two-dimensional arrays of data elements, followed by step 201 that provides a two-dimensional array of processing elements, wherein array dimensions of the two-dimensional array of processing elements correspond to array dimensions of the multiple two-dimensional arrays of data elements. Then step 202 controls selection of a selected data processing operation by a corresponding operation control value in a second two-dimensional array of data elements and step 203 controls selection of a neighbouring processing element by a corresponding source control value in the second two-dimensional array of data elements. Finally step 204 performs, in each processing element of the two-dimensional array of processing elements, a selected data processing operation, wherein, for each processing element not in a starting set of processing elements, the selected data processing operation takes as an operand a respective data value provided by the neighbouring data element of the first two-dimensional array of data elements.

Various example configurations are set out in the following numbered clauses.

Clause 1. Apparatus comprising:

array storage circuitry configured to hold multiple two-dimensional arrays of data elements; and a two-dimensional array of processing elements, wherein array dimensions of the two-dimensional array of processing elements correspond to array dimensions of the multiple two-dimensional arrays of data elements, wherein:

a first two-dimensional array of data elements provides data values for processing by the two-dimensional array of processing elements, and a second two-dimensional array of data elements provides control values to control processing performed by the two-dimensional array of processing elements, wherein each processing element of the two-dimensional array of processing elements is configured to perform a selected data processing operation and a selection of the selected data processing operation is controlled by a corresponding operation control value in the second two-dimensional array of data elements, wherein the two-dimensional array of processing elements is configured to have a data flow direction across the two-dimensional array of processing elements, and the data flow direction proceeds from a starting set of processing elements of the two-dimensional array of processing elements, and wherein, for each processing element not in the starting set of processing elements, the selected data processing operation takes as an operand a respective data value provided by a neighbouring data element of the first two-dimensional array of data elements and a selection of the neighbouring processing element is controlled by a corresponding source control value in the second two-dimensional array of data elements.

Clause 2. The apparatus of Clause 1, further comprising:

vector register circuitry configured to hold vectors of data elements, wherein a vector of data elements corresponds to a single array dimension of each of the multiple two-dimensional arrays of data elements, and wherein the apparatus is configured to:

provide a selected input vector of data elements as input data for processing by the two-dimensional array of processing elements; and/or receive in a selected output vector of data elements processed data from the two-dimensional array of processing elements.

Clause 3. The apparatus of Clause 1 or Clause 2, wherein the two-dimensional array of processing elements is configured to interpret the control values of the second two-dimensional array of data elements in a bitwise manner, wherein each bit of a control value has a defined semantic meaning for controlling the processing performed by the two-dimensional array of processing elements.

Clause 4. The apparatus of Clause 2, wherein two bits of the corresponding source control value respectively identify corresponding data elements of the selected input vector of data elements.

Clause 5. The apparatus of any of Clauses 2-4, wherein the apparatus is configured to:

provide the selected input vector of data elements as the input data for processing by the starting set of processing elements.

Clause 6. The apparatus of any of Clauses 2-5, wherein the apparatus is configured to:

provide the selected input vector of data elements as the input data for processing to respective processing elements of a sequence of processing elements in the data flow direction.

Clause 7. The apparatus of any preceding Clause, wherein, for each processing element of the two-dimensional array of processing elements, the neighbouring data element of the first two-dimensional array of data elements is not further in the data flow direction.

Clause 8. The apparatus of any preceding Clause, wherein at least one further two-dimensional array of data elements provides at least one further set of data values for processing in combination with the data values provided by the first two-dimensional array of data elements.

Clause 9. The apparatus of any preceding Clause, wherein the corresponding operation control value in the second two-dimensional array of data elements and the corresponding source control value in the second two-dimensional array of data elements comprise respective first and second portions of a corresponding control value in the second two-dimensional array of data elements.

Clause 10. The apparatus of Clause 3, or any of Clauses 4-9 when dependent on Clause 3, wherein five bits of the corresponding source control value respectively identify five neighbouring data elements of the first two-dimensional array of data elements that are not further in the data flow direction.

Clause 11. The apparatus of Clause 10, wherein for each processing element of the two-dimensional array of processing elements one bit of the corresponding source control value indicates that processing element should use as an operand its own corresponding data element from one of the two-dimensional arrays of data elements.

Clause 12. The apparatus of any preceding Clause comprising:

instruction decoding circuitry configured to decode data processing instructions and to generate control signals to control operation of the apparatus as determined by the data processing instructions.

Clause 13. The apparatus of Clause 12, wherein the instruction decoding circuitry is responsive to an array processing instruction specifying the first two-dimensional array of data elements and the second two-dimensional array of data elements to generate the control signals to cause:

selected operands for the selected data processing operations for the two-dimensional array of processing elements to be provided to the respective processing elements; and the respective processing elements of the two-dimensional array of processing elements to perform the selected data processing operations.

Clause 14. The apparatus of Clause 12 or Clause 13, wherein the instruction decoding circuitry is responsive to an operand provision instruction specifying the first two-dimensional array of data elements to cause:

selected operands for the selected data processing operations for the two-dimensional array of processing elements to be provided to the respective processing elements.

Clause 15. The apparatus of any of Clauses 12-14, wherein the instruction decoding circuitry is responsive to an array operation instruction specifying the second two-dimensional array of data elements to cause:

the respective processing elements of the two-dimensional array of processing elements to perform the selected data processing operations.

Clause 16. The apparatus of any preceding Clause, wherein the selected data processing operation is a multiply operation.

Clause 17. The apparatus of any preceding Clause, wherein the selected data processing operation is a fused multiply-accumulate operation.

Clause 18. A computer program for controlling a host data processing apparatus to provide an instruction execution environment, the computer program comprising:

array storage program logic configured to hold multiple two-dimensional arrays of data elements; and program logic providing a two-dimensional array of processing elements, wherein array dimensions of the two-dimensional array of processing elements correspond to array dimensions of the multiple two-dimensional arrays of data elements, wherein:

a first two-dimensional array of data elements provides data values for processing by the two-dimensional array of processing elements, and a second two-dimensional array of data elements provides control values to control processing performed by the two-dimensional array of processing elements, wherein each processing element of the two-dimensional array of processing elements is configured to perform a selected data processing operation and a selection of the selected data processing operation is controlled by a corresponding operation control value in the second two-dimensional array of data elements, wherein the two-dimensional array of processing elements is configured to have a data flow direction across the two-dimensional array of processing elements, and the data flow direction proceeds from a starting set of processing elements of the two-dimensional array of processing elements, and wherein, for each processing element not in the starting set of processing elements, the selected data processing operation takes as an operand a respective data value provided by a neighbouring data element of the first two-dimensional array of data elements and a selection of the neighbouring processing element is controlled by a corresponding source control value in the second two-dimensional array of data elements.

Clause 19. A method comprising:

providing array storage configured to hold multiple two-dimensional arrays of data elements;

providing a two-dimensional array of processing elements, wherein array dimensions of the two-dimensional array of processing elements correspond to array dimensions of the multiple two-dimensional arrays of data elements, wherein:

a first two-dimensional array of data elements provides data values for processing by the two-dimensional array of processing elements, and a second two-dimensional array of data elements provides control values to control processing performed by the two-dimensional array of processing elements;

performing, in each processing element of the two-dimensional array of processing elements, a selected data processing operation;

controlling a selection of the selected data processing operation by a corresponding operation control value in the second two-dimensional array of data elements, wherein the two-dimensional array of processing elements is configured to have a data flow direction across the two-dimensional array of processing elements, and the data flow direction proceeds from a starting set of processing elements of the two-dimensional array of processing elements, and wherein, for each processing element not in the starting set of processing elements, the selected data processing operation takes as an operand a respective data value provided by a neighbouring data element of the first two-dimensional array of data elements; and controlling a selection of the neighbouring processing element by a corresponding source control value in the second two-dimensional array of data elements.

In brief overall summary, apparatuses, computer programs and methods are disclosed, relating 2D arrays of data elements and a 2D array of processing elements. A first 2D array of data elements provides data values for processing by each processing element and a second 2D array of data elements provides control values controlling the processing. The 2D array of processing elements has a data flow direction across the 2D array of processing elements, and the data flow direction proceeds from a starting set of processing elements of the 2D array of processing elements. For each processing element not in the starting set of processing elements, the data processing operation preformed takes as an operand a respective data value provided by a neighbouring data element of the first 2D array of data elements and selection of the neighbouring processing element is controlled by a corresponding source control value in the second 2D array of data elements.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware, which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. Apparatus comprising:

array storage circuitry configured to hold multiple two-dimensional arrays of data elements; and a two-dimensional array of processing elements, wherein array dimensions of the two-dimensional array of processing elements correspond to array dimensions of the multiple two-dimensional arrays of data elements, wherein:

a first two-dimensional array of data elements, from among the multiple two-dimensional arrays, provides data values for processing by the two-dimensional array of processing elements, and a second two-dimensional array of data elements, from among the multiple two-dimensional arrays, provides control values to control processing performed by the two-dimensional array of processing elements, wherein each processing element of the two-dimensional array of processing elements is configured to perform a selected data processing operation and a selection of the selected data processing operation is controlled by a corresponding operation control value in the second two-dimensional array of data elements, wherein the two-dimensional array of processing elements is configured to have a data flow direction across the two-dimensional array of processing elements, and the data flow direction proceeds from a starting set of processing elements of the two-dimensional array of processing elements, and wherein, for each processing element not in the starting set of processing elements, the selected data processing operation takes as an operand a respective data value provided by a neighboring data element of the first two-dimensional array of data elements and a selection of the neighboring processing element is controlled by a corresponding source control value in the second two-dimensional array of data elements.

2. The apparatus of claim 1, further comprising:

vector register circuitry configured to hold vectors of data elements, wherein a vector of data elements corresponds to a single array dimension of each of the multiple two-dimensional arrays of data elements, and wherein the apparatus is configured to:

provide a selected input vector of data elements as input data for processing by the two-dimensional array of processing elements; and/or receive in a selected output vector of data elements processed data from the two-dimensional array of processing elements.

3. The apparatus of claim 1, wherein the two-dimensional array of processing elements is configured to interpret the control values of the second two-dimensional array of data elements in a bitwise manner, wherein each bit of a control value has a defined semantic meaning for controlling the processing performed by the two-dimensional array of processing elements.

4. The apparatus of claim 2, wherein two bits of the corresponding source control value respectively identify corresponding data elements of the selected input vector of data elements.

5. The apparatus of claim 2, wherein the apparatus is configured to:

provide the selected input vector of data elements as the input data for processing by the starting set of processing elements.

6. The apparatus of claim 2, wherein the apparatus is configured to:

provide the selected input vector of data elements as the input data for processing to respective processing elements of a sequence of processing elements in the data flow direction.

7. The apparatus of claim 1, wherein, for each processing element of the two-dimensional array of processing elements, the neighboring data element of the first two-dimensional array of data elements is not further in the data flow direction.

8. The apparatus of claim 1, wherein at least one further two-dimensional array of data elements provides at least one further set of data values for processing in combination with the data values provided by the first two-dimensional array of data elements.

9. The apparatus of claim 1, wherein the corresponding operation control value in the second two-dimensional array of data elements and the corresponding source control value in the second two-dimensional array of data elements comprise respective first and second portions of a corresponding control value in the second two-dimensional array of data elements.

10. The apparatus of claim 3, wherein five bits of the corresponding source control value respectively identify five neighboring data elements of the first two-dimensional array of data elements that are not further in the data flow direction.

11. The apparatus of claim 10, wherein for each processing element of the two-dimensional array of processing elements one bit of the corresponding source control value indicates that processing element should use as an operand its own corresponding data element from one of the two-dimensional arrays of data elements.

12. The apparatus of claim 1 comprising:

instruction decoding circuitry configured to decode data processing instructions and to generate control signals to control operation of the apparatus as determined by the data processing instructions.

13. The apparatus of claim 12, wherein the instruction decoding circuitry is responsive to an array processing instruction specifying the first two-dimensional array of data elements and the second two-dimensional array of data elements to generate the control signals to cause:

selected operands for the selected data processing operations for the two-dimensional array of processing elements to be provided to the respective processing elements; and the respective processing elements of the two-dimensional array of processing elements to perform the selected data processing operations.

14. The apparatus of claim 12, wherein the instruction decoding circuitry is responsive to an operand provision instruction specifying the first two-dimensional array of data elements to cause:

selected operands for the selected data processing operations for the two-dimensional array of processing elements to be provided to the respective processing elements.

15. The apparatus of claim 12, wherein the instruction decoding circuitry is responsive to an array operation instruction specifying the second two-dimensional array of data elements to cause:

the respective processing elements of the two-dimensional array of processing elements to perform the selected data processing operations.

16. The apparatus of claim 1, wherein the selected data processing operation is a multiply operation.

17. The apparatus of claim 1, wherein the selected data processing operation is a fused multiply-accumulate operation.

18. A non-transitory, computer-readable medium storing computer program for controlling a host data processing apparatus to provide an instruction execution environment, the computer program comprising:

array storage program logic configured to hold multiple two-dimensional arrays of data elements; and program logic providing a two-dimensional array of processing elements, wherein array dimensions of the two-dimensional array of processing elements correspond to array dimensions of the multiple two-dimensional arrays of data elements, wherein:

a first two-dimensional array of data elements, from among the multiple two-dimensional arrays, provides data values for processing by the two-dimensional array of processing elements, and a second two-dimensional array of data elements, from among the multiple two-dimensional arrays, provides control values to control processing performed by the two-dimensional array of processing elements, wherein each processing element of the two-dimensional array of processing elements is configured to perform a selected data processing operation and a selection of the selected data processing operation is controlled by a corresponding operation control value in the second two-dimensional array of data elements, wherein the two-dimensional array of processing elements is configured to have a data flow direction across the two-dimensional array of processing elements, and the data flow direction proceeds from a starting set of processing elements of the two-dimensional array of processing elements, and wherein, for each processing element not in the starting set of processing elements, the selected data processing operation takes as an operand a respective data value provided by a neighboring data element of the first two-dimensional array of data elements and a selection of the neighboring processing element is controlled by a corresponding source control value in the second two-dimensional array of data elements.

19. A method comprising:

providing array storage configured to hold multiple two-dimensional arrays of data elements;

providing a two-dimensional array of processing elements, wherein array dimensions of the two-dimensional array of processing elements correspond to array dimensions of the multiple two-dimensional arrays of data elements, wherein:

a first two-dimensional array of data elements, from among the multiple two-dimensional arrays, provides data values for processing by the two-dimensional array of processing elements, and a second two-dimensional array of data elements, from among the multiple two-dimensional arrays, provides control values to control processing performed by the two-dimensional array of processing elements;

performing, in each processing element of the two-dimensional array of processing elements, a selected data processing operation;

controlling a selection of the selected data processing operation by a corresponding operation control value in the second two-dimensional array of data elements, wherein the two-dimensional array of processing elements is configured to have a data flow direction across the two-dimensional array of processing elements, and the data flow direction proceeds from a starting set of processing elements of the two-dimensional array of processing elements, and wherein, for each processing element not in the starting set of processing elements, the selected data processing operation takes as an operand a respective data value provided by a neighboring data element of the first two-dimensional array of data elements; and controlling a selection of the neighboring processing element by a corresponding source control value in the second two-dimensional array of data elements.

* * * * *